US008252171B2

(12) United States Patent
Doran

(10) Patent No.: US 8,252,171 B2
(45) Date of Patent: Aug. 28, 2012

(54) WATER PURIFICATION, ENHANCEMENT, AND DISPENSING APPLIANCE

(76) Inventor: Paul S. Doran, Columbia Falls, MT (US)

( * ) Notice: Subject to any disclaimer, the term of this patent is extended or adjusted under 35 U.S.C. 154(b) by 702 days.

(21) Appl. No.: 12/324,567

(22) Filed: Nov. 26, 2008

(65) Prior Publication Data

US 2009/0134074 A1 May 28, 2009

Related U.S. Application Data

(60) Provisional application No. 61/004,691, filed on Nov. 28, 2007.

(51) Int. Cl.
*B01D 17/12* (2006.01)
(52) U.S. Cl. ......... 210/87; 210/96.2; 210/143; 210/192; 210/203; 210/243; 210/258; 210/259
(58) Field of Classification Search .................. 210/236, 210/87, 96.1, 96.2, 143, 192, 202, 203, 243, 210/258, 259, 321.6, 424
See application file for complete search history.

(56) References Cited

U.S. PATENT DOCUMENTS

| 3,838,774 | A | * | 10/1974 | Dolan et al. ..................... 210/85 |
| 4,081,148 | A | | 3/1978 | Murphy |
| 4,160,727 | A | * | 7/1979 | Harris, Jr. ...................... 210/639 |
| 4,280,912 | A | * | 7/1981 | Berry et al. ..................... 210/662 |
| 4,460,472 | A | | 7/1984 | Kapiloff et al. |
| 4,528,093 | A | * | 7/1985 | Winer .......................... 210/96.2 |
| 4,587,518 | A | | 5/1986 | King |
| 4,784,763 | A | | 11/1988 | Hambleton et al. |
| 4,808,287 | A | | 2/1989 | Hark |
| 5,006,234 | A | | 4/1991 | Menon et al. |
| 5,038,091 | A | | 8/1991 | Bashark |
| 5,435,909 | A | * | 7/1995 | Burrows .......................... 210/85 |
| 5,597,487 | A | | 1/1997 | Vogel et al. |
| 5,615,764 | A | | 4/1997 | Satoh |
| 5,865,991 | A | | 2/1999 | Hsu |
| 5,915,851 | A | | 6/1999 | Wattrick et al. |
| 6,013,180 | A | * | 1/2000 | Wang .............................. 210/232 |
| 6,080,313 | A | * | 6/2000 | Kelada ........................... 210/631 |
| 6,190,558 | B1 | * | 2/2001 | Robbins ........................ 210/652 |
| 6,461,514 | B1 | * | 10/2002 | Al-Samadi .................... 210/652 |
| 6,616,839 | B1 | * | 9/2003 | Peterson et al. .............. 210/241 |
| 7,501,064 | B2 | * | 3/2009 | Schmidt et al. ............... 210/652 |

(Continued)

FOREIGN PATENT DOCUMENTS

EP 1614437 A1 1/2006

(Continued)

*Primary Examiner* — Joseph Drodge
(74) *Attorney, Agent, or Firm* — Jean Kyle

(57) ABSTRACT

A water purifying and enhancement system of a modular construction designed as a built-in appliance located under the countertop or as a free-standing (stand alone) unit. The water appliance has a water inlet for obtaining water from a supply source, scale reduction device, booster or re-pressurization pump, pre-filtration, U.V. sterilization, R.O. filtration, de-ionization (CDI or mechanical), mineral injection system (for adding desired minerals into the purified water), water diagnostic and monitoring cells, post filtration, proprietary water enhancement reactor consisting of specially engineered and blended ores of ceramic components, and/or an electrolytic ionization chamber, and/or a magnetic chamber, a water outlet for delivery of the highly purified enhanced water product, and a outlet to grey water drain for reject water. Control and monitoring instrumentation implemented into the front panel of the water appliance will continuously provide monitoring of water quality, filter life, filter maintenance, system failure indicators, and other pertinent diagnostic data.

6 Claims, 40 Drawing Sheets

PART 1

PART 2

U.S. PATENT DOCUMENTS

| | | | |
|---|---|---|---|
| 7,718,054 B2 * | 5/2010 | Duplessis et al. | 210/85 |
| 7,837,866 B2 * | 11/2010 | Burrows | 210/97 |
| 2004/0050786 A1 | 3/2004 | Dey | |
| 2006/0138031 A1 * | 6/2006 | Kloos et al. | 210/96.2 |
| 2006/0213821 A1 | 9/2006 | Choi et al. | |
| 2006/0219613 A1 | 10/2006 | Scheu et al. | |
| 2006/0226081 A1 | 10/2006 | Lupton et al. | |
| 2007/0084793 A1 | 4/2007 | Wenden | |

FOREIGN PATENT DOCUMENTS

| | | |
|---|---|---|
| EP | 1726571 A1 | 11/2006 |

* cited by examiner

PART 1

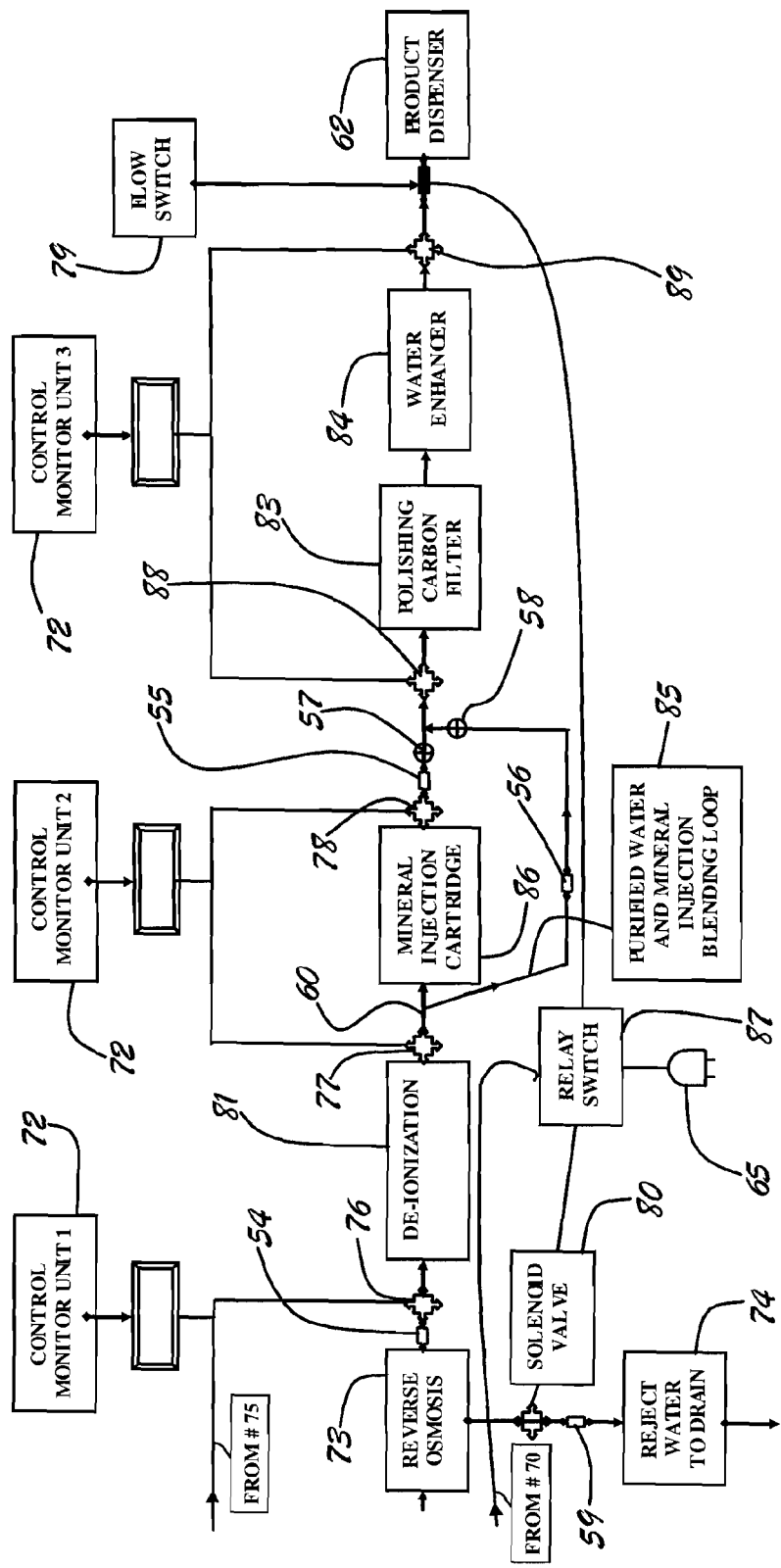
FIG. 5 PART 2

PART 1

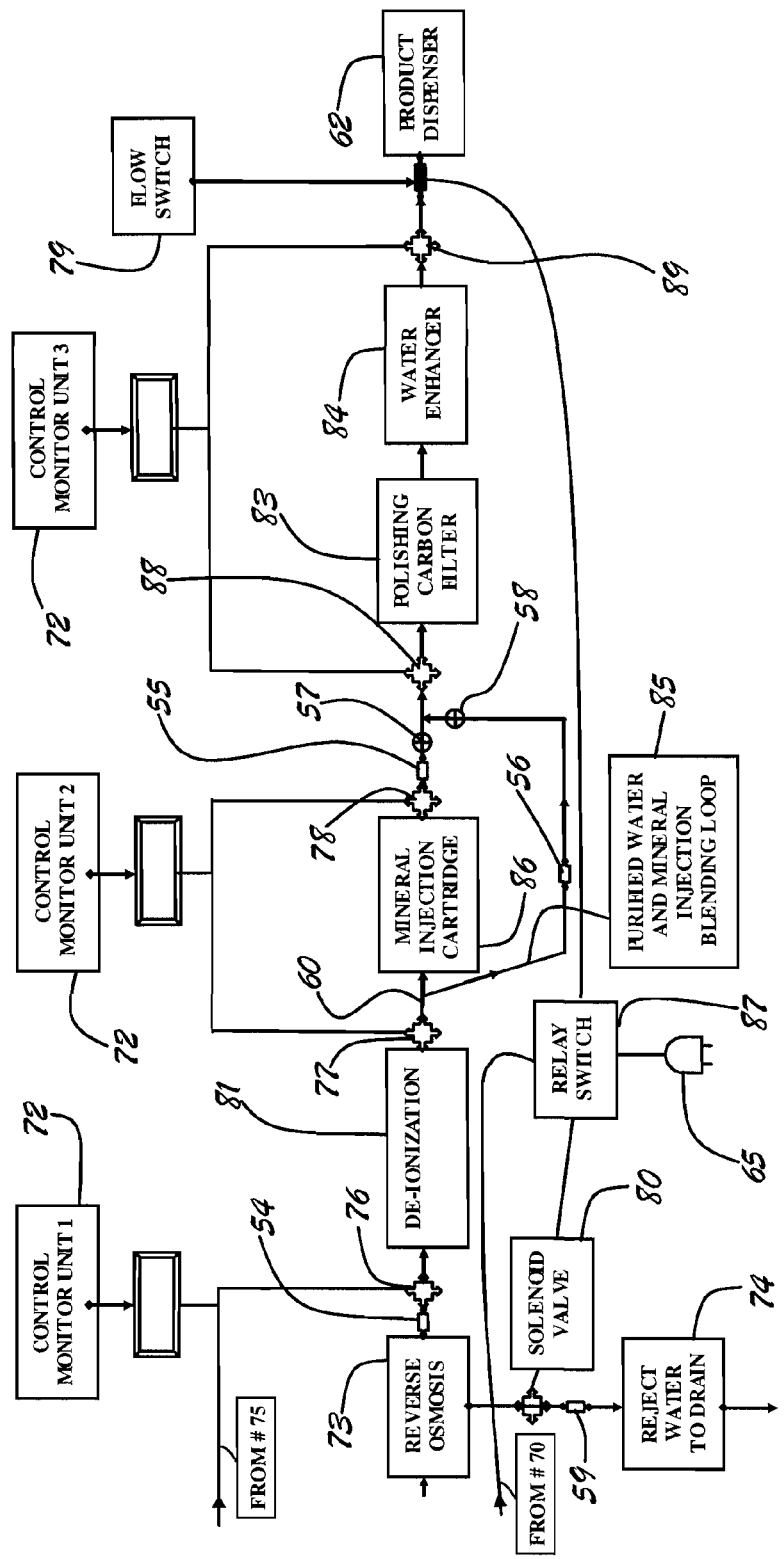
FIG. 6 PART 2

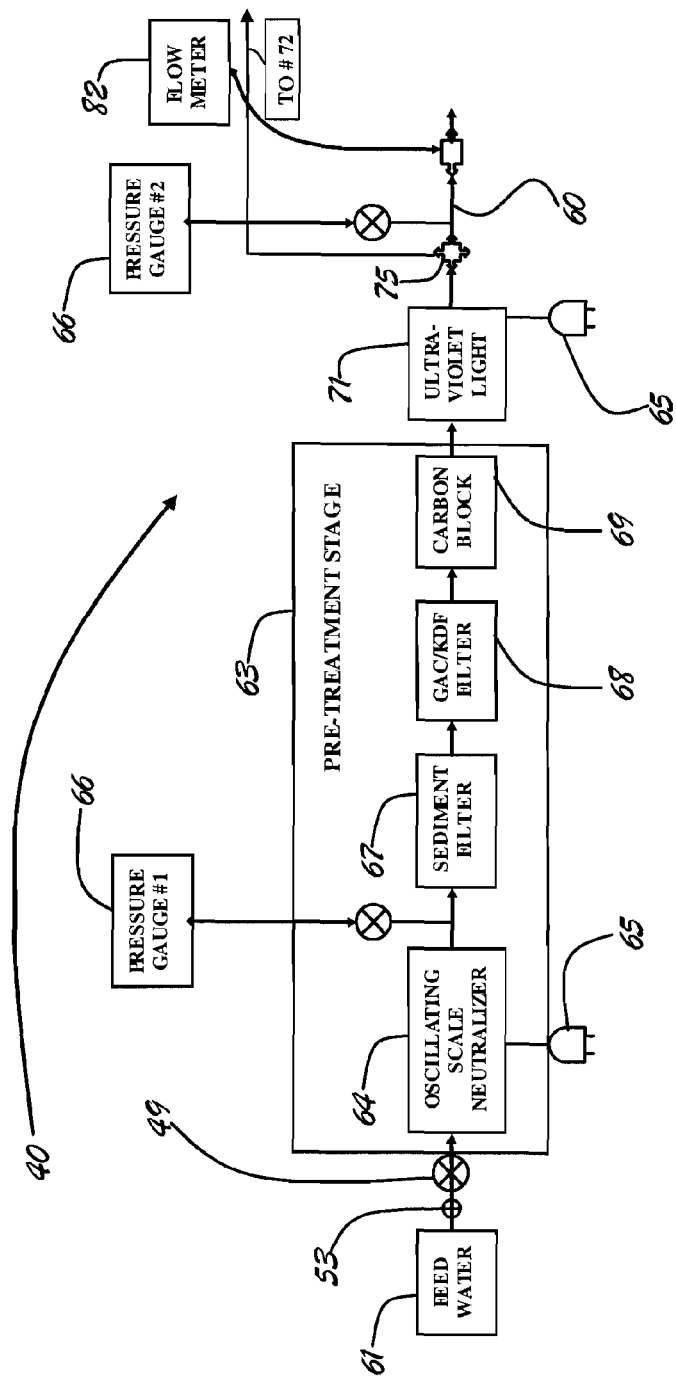
FIG. 7 PART 1

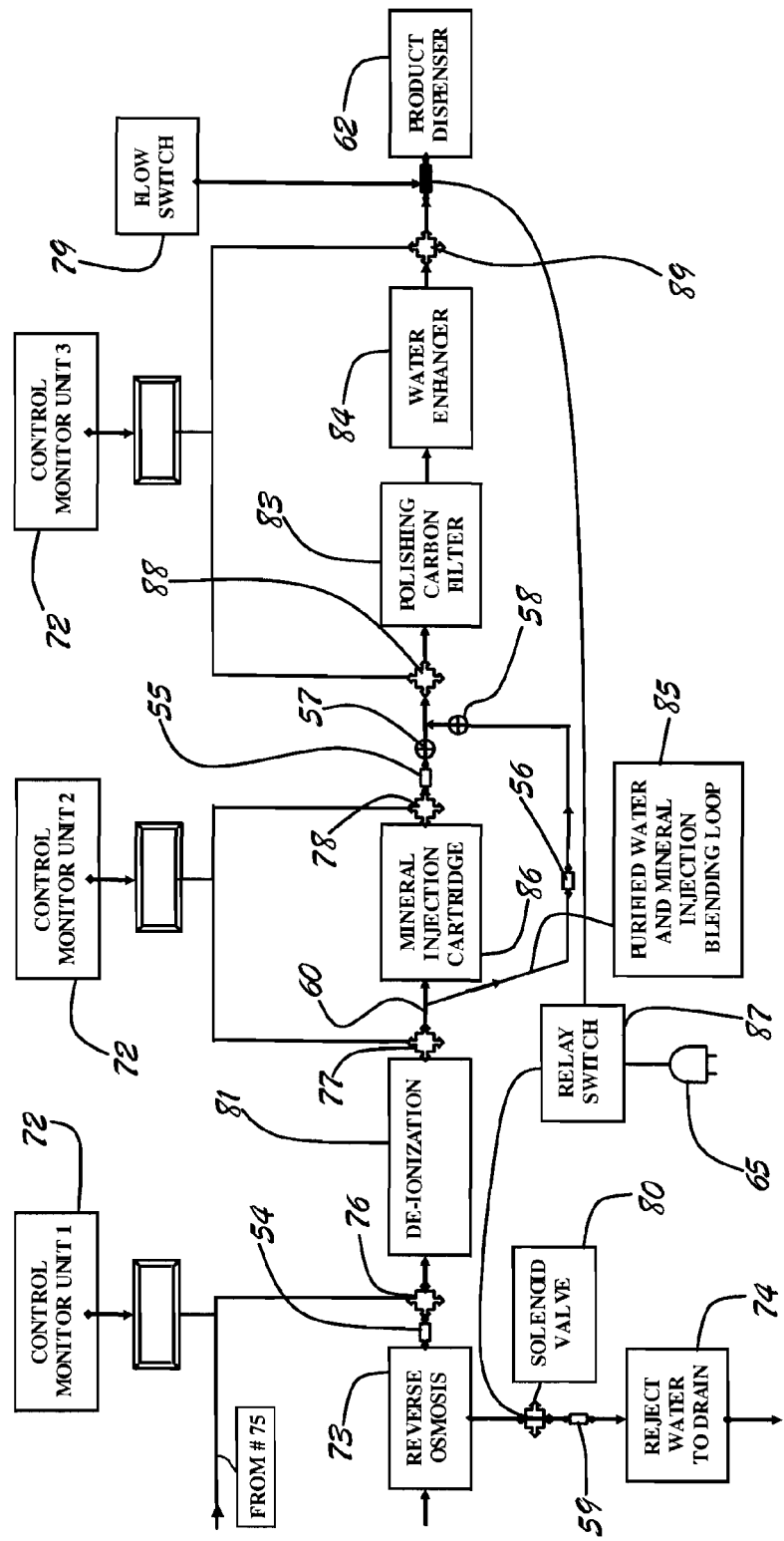
FIG. 7 PART 2

PART 1

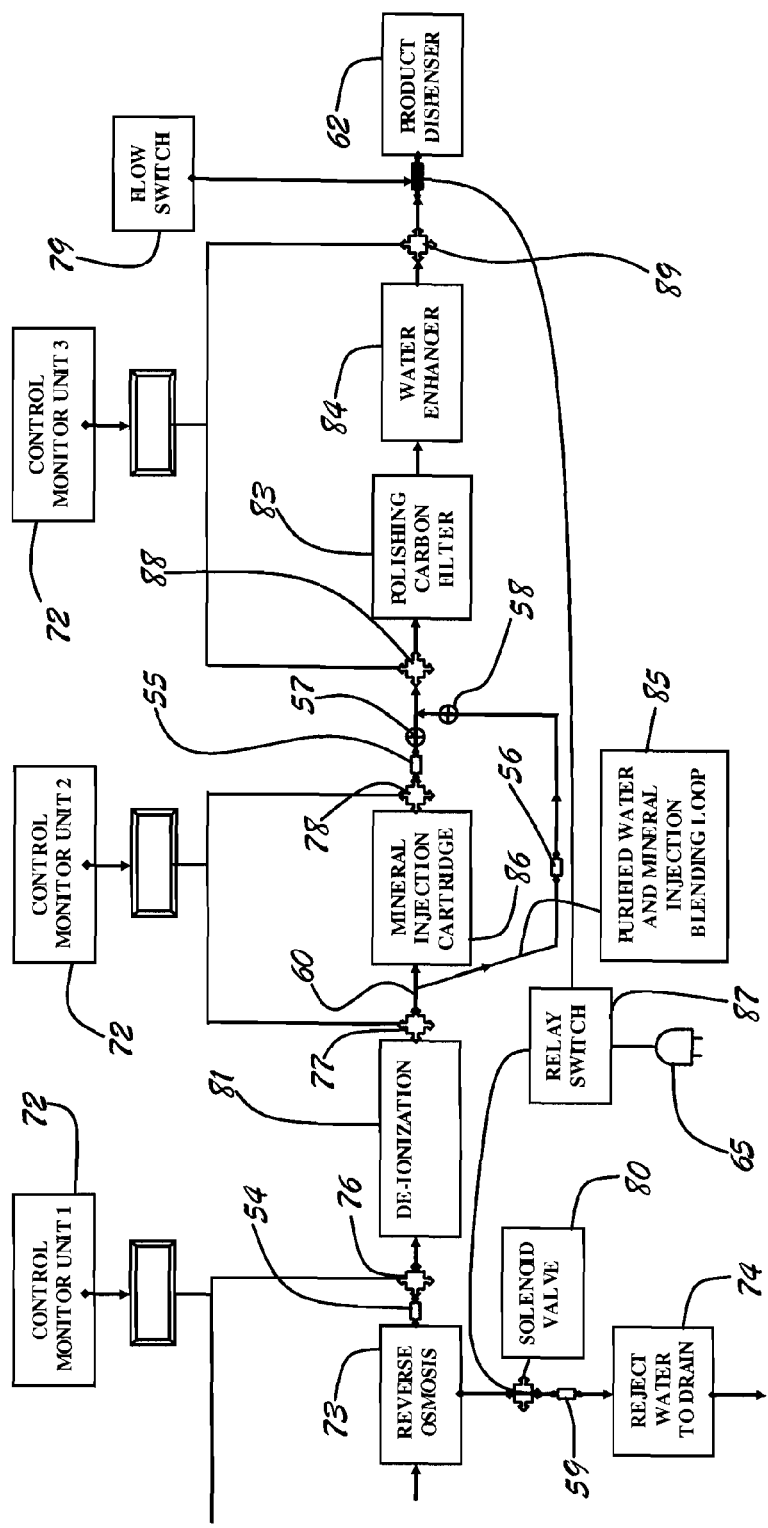
FIG. 8 PART 2

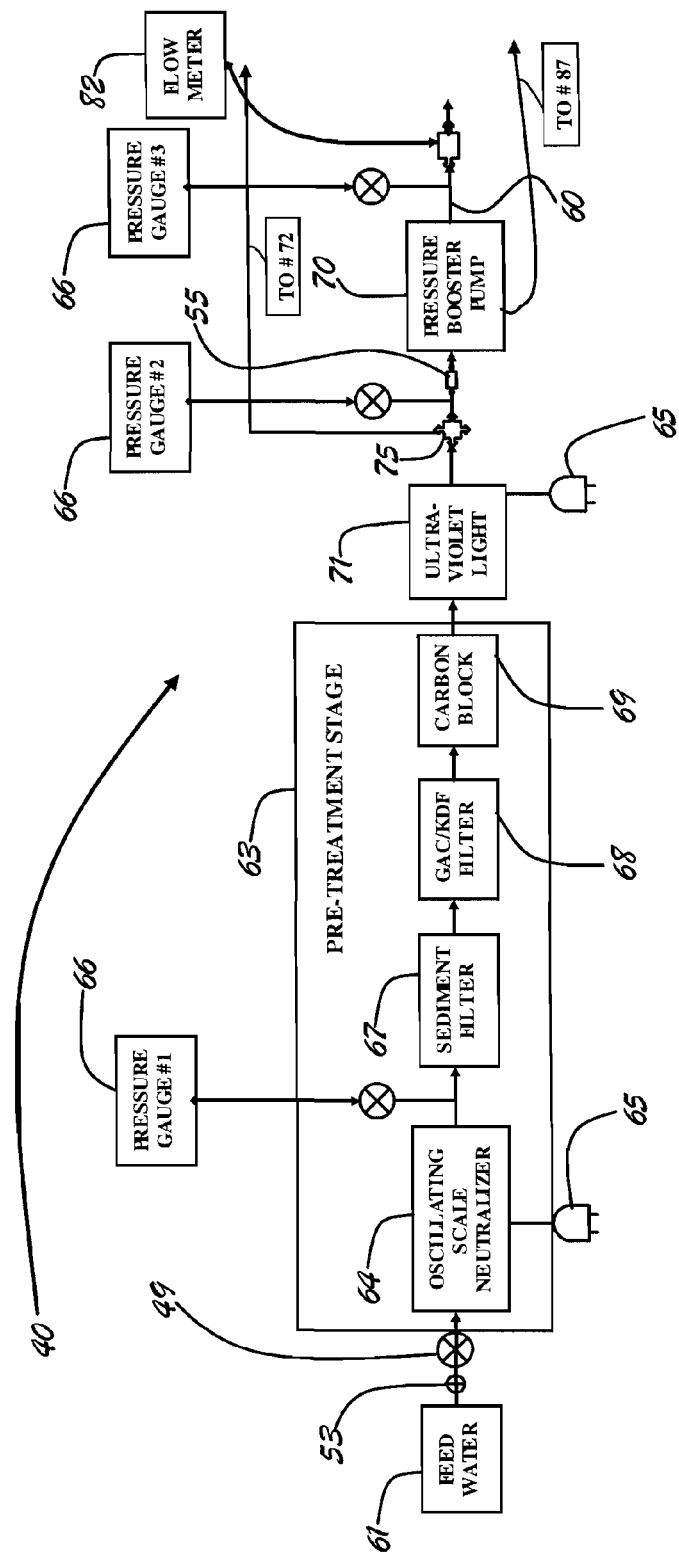
FIG. 9 PART 1

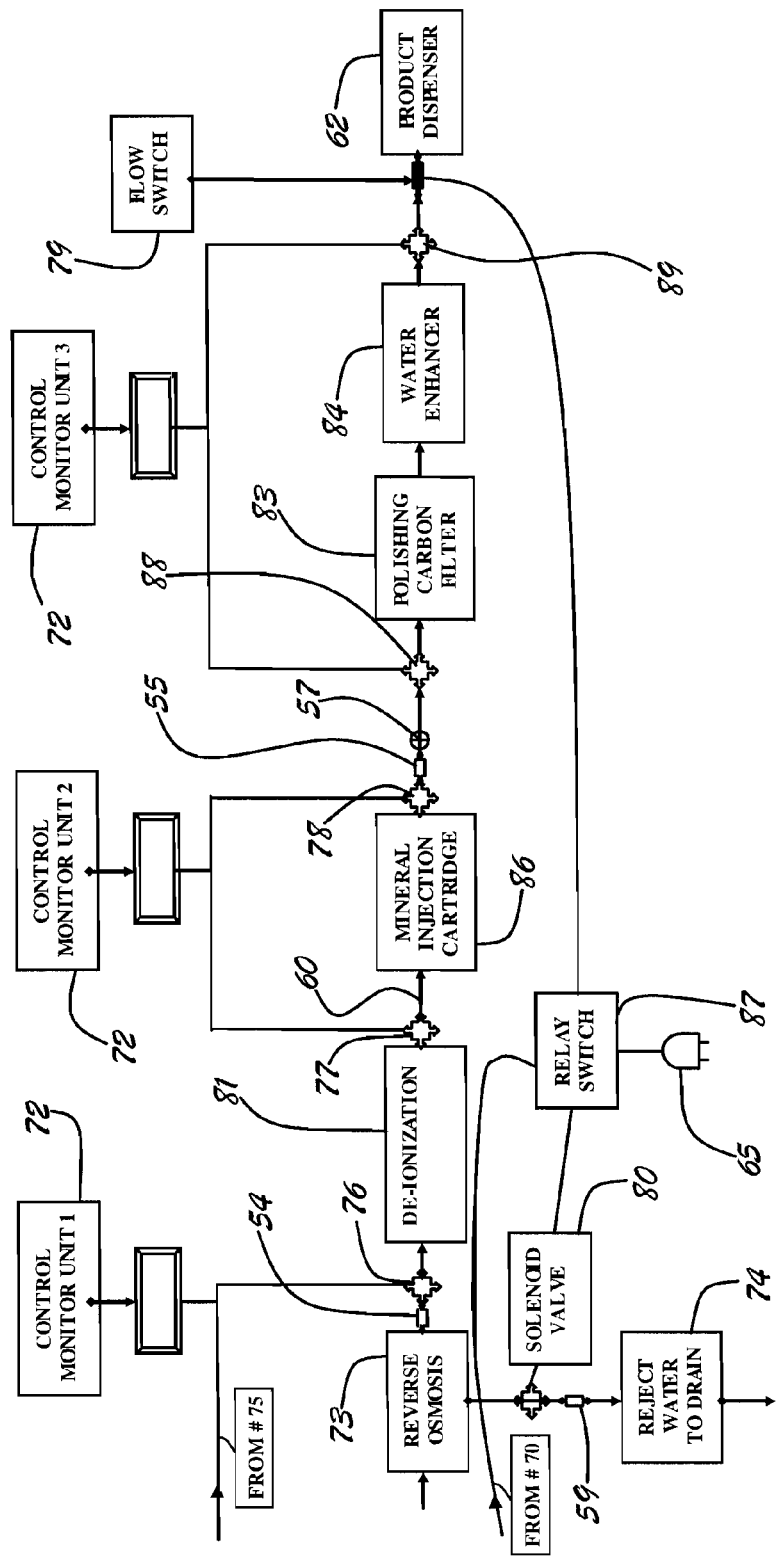
FIG. 9 PART 2

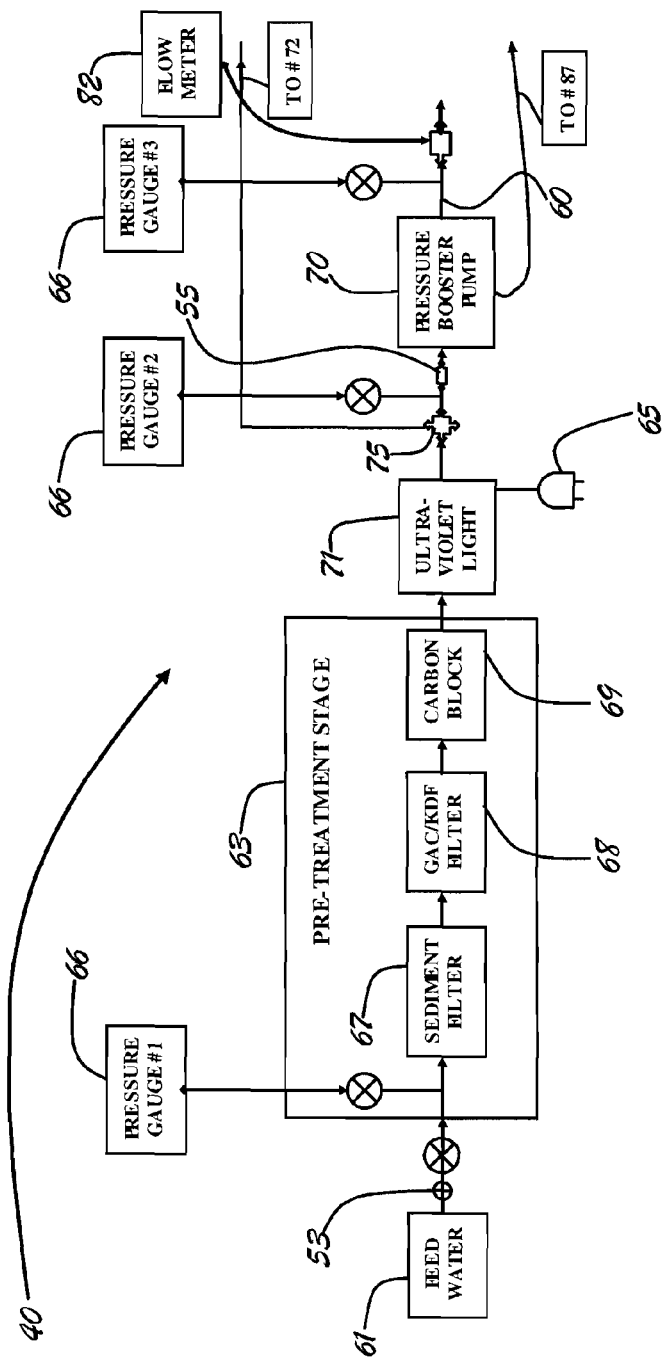
FIG. 10 PART 1

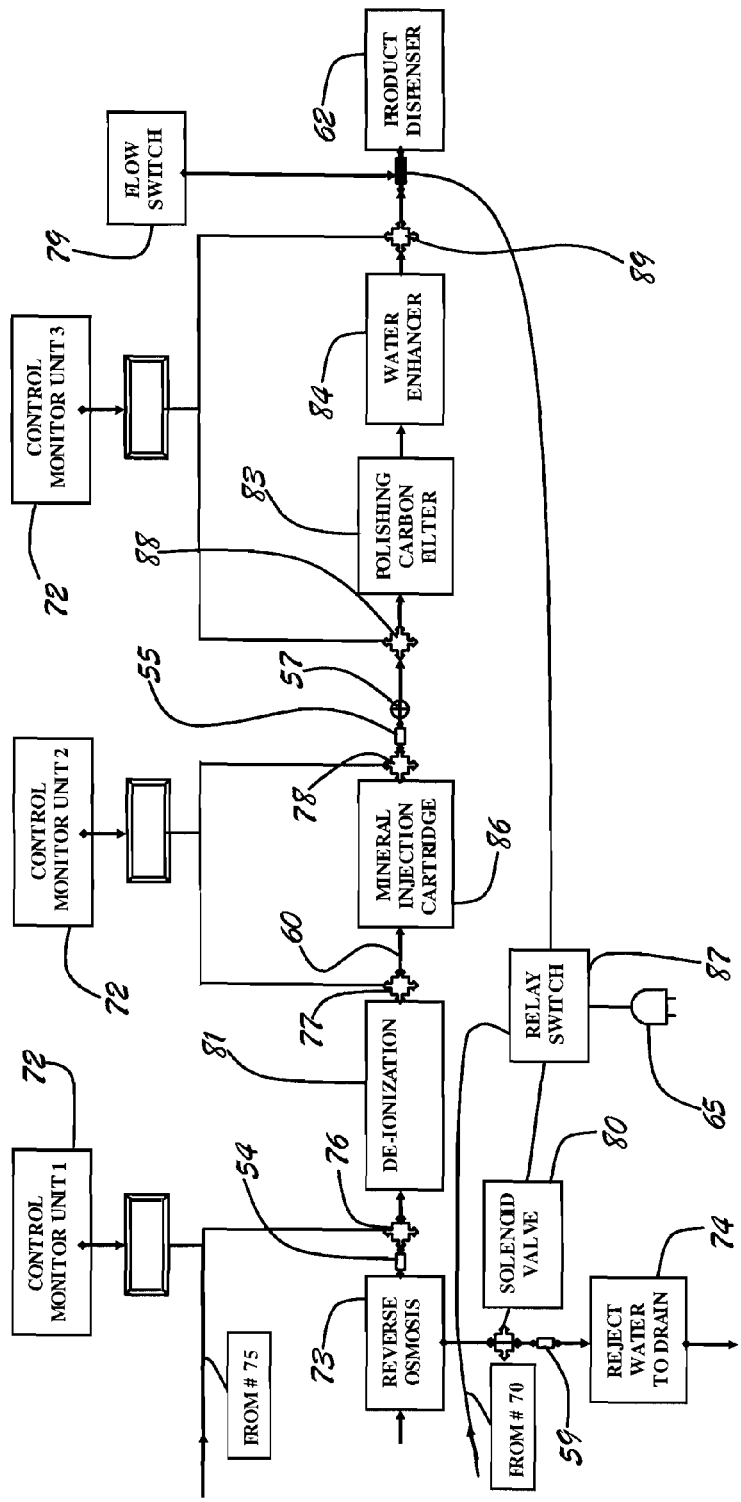
FIG. 10 PART 2

PART 1

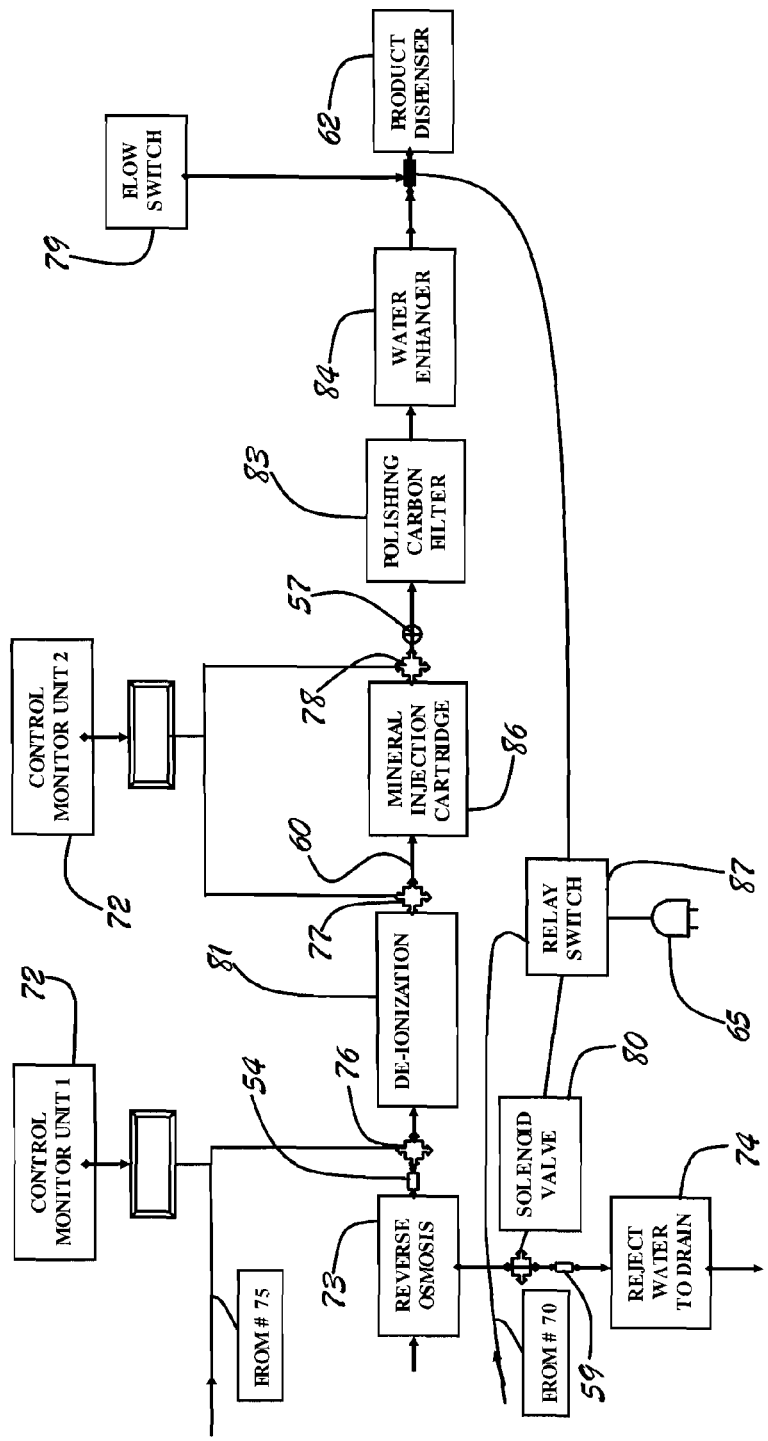
FIG. 11 PART 2

PART 1

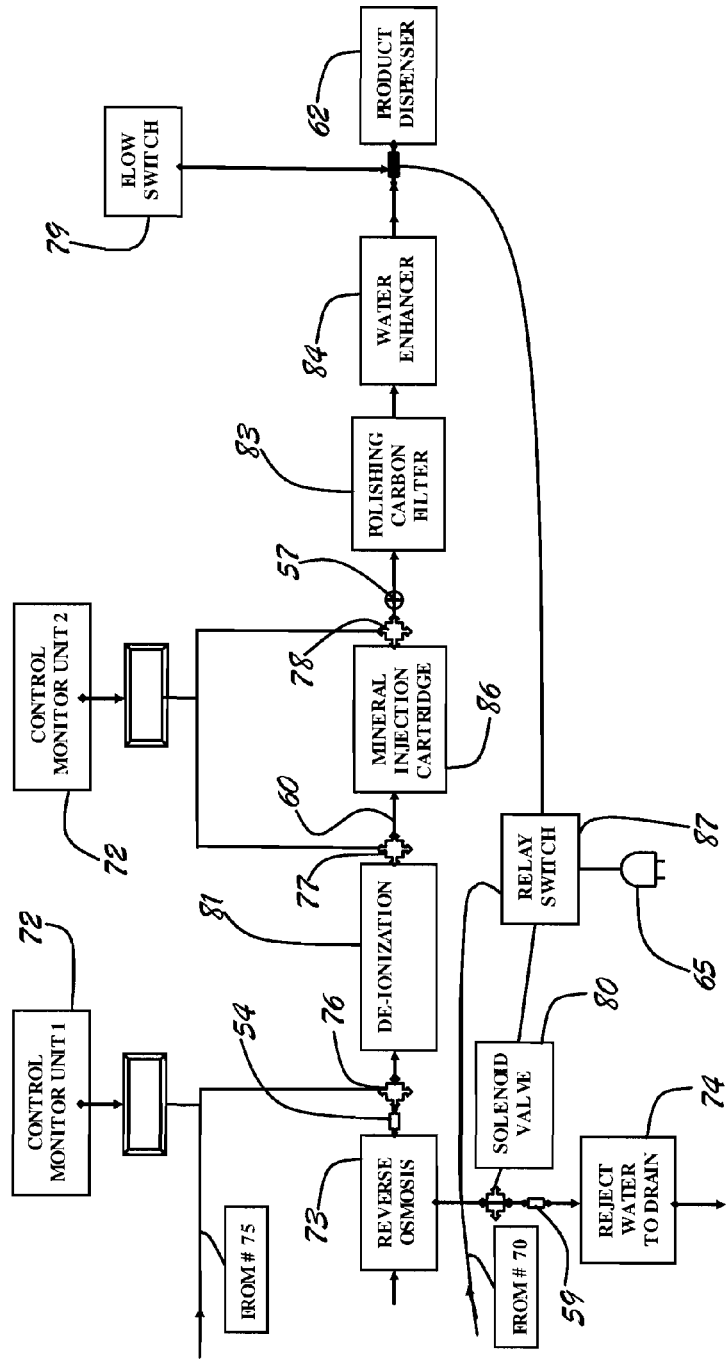
FIG. 12 PART 2

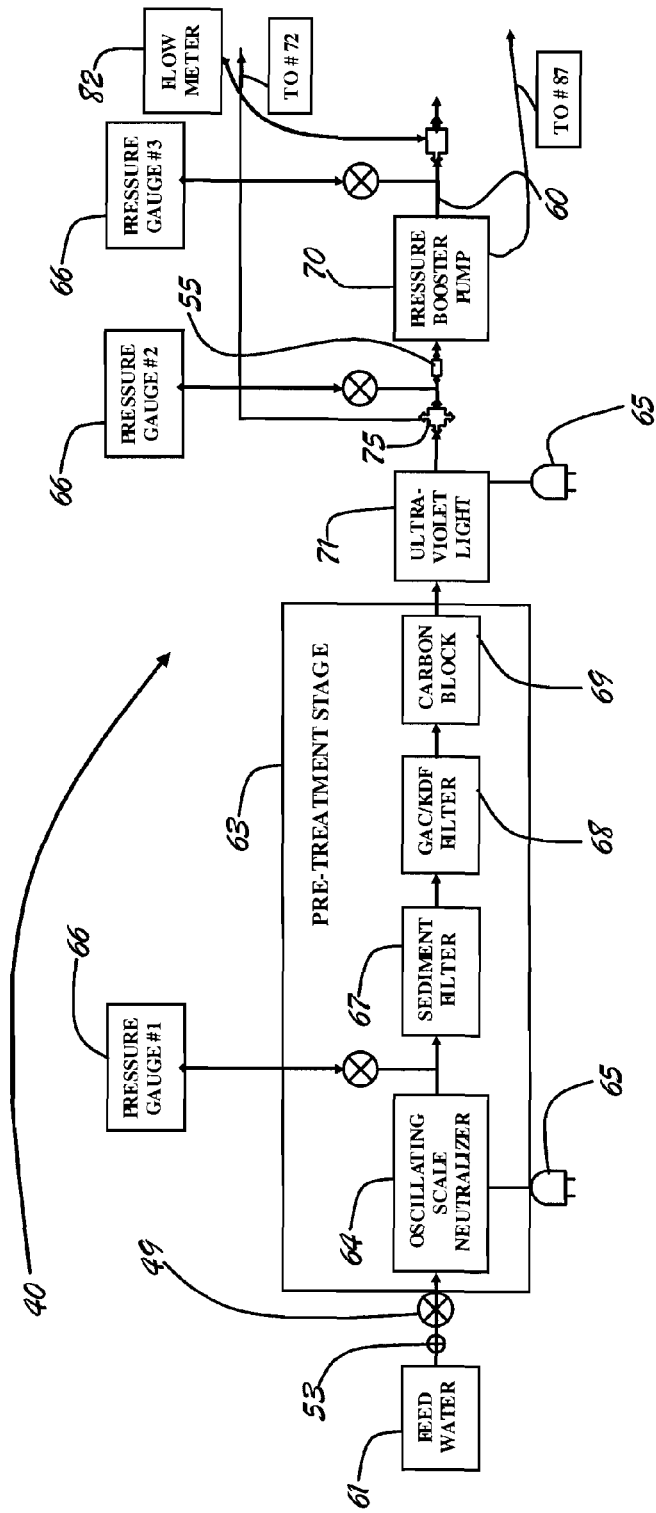
FIG. 13 PART 1

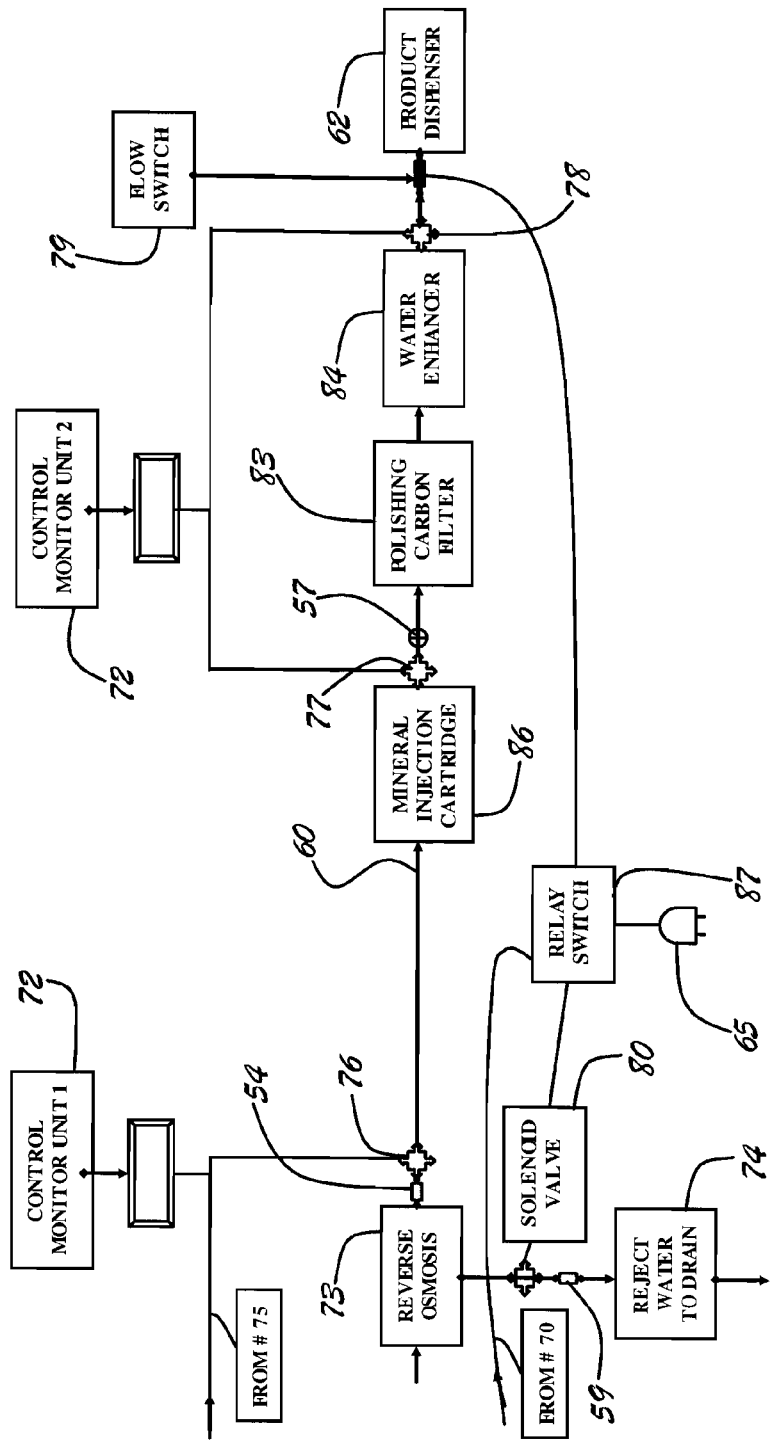
FIG. 13 PART 2

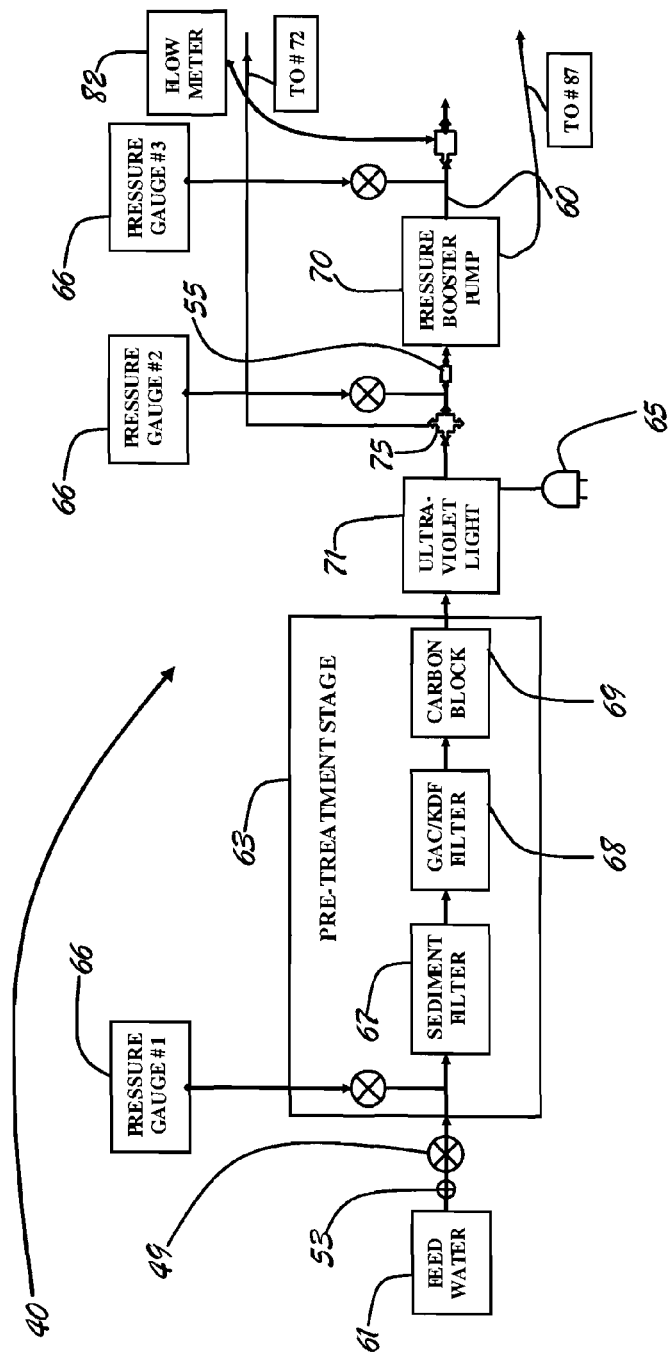
FIG. 14 PART 1

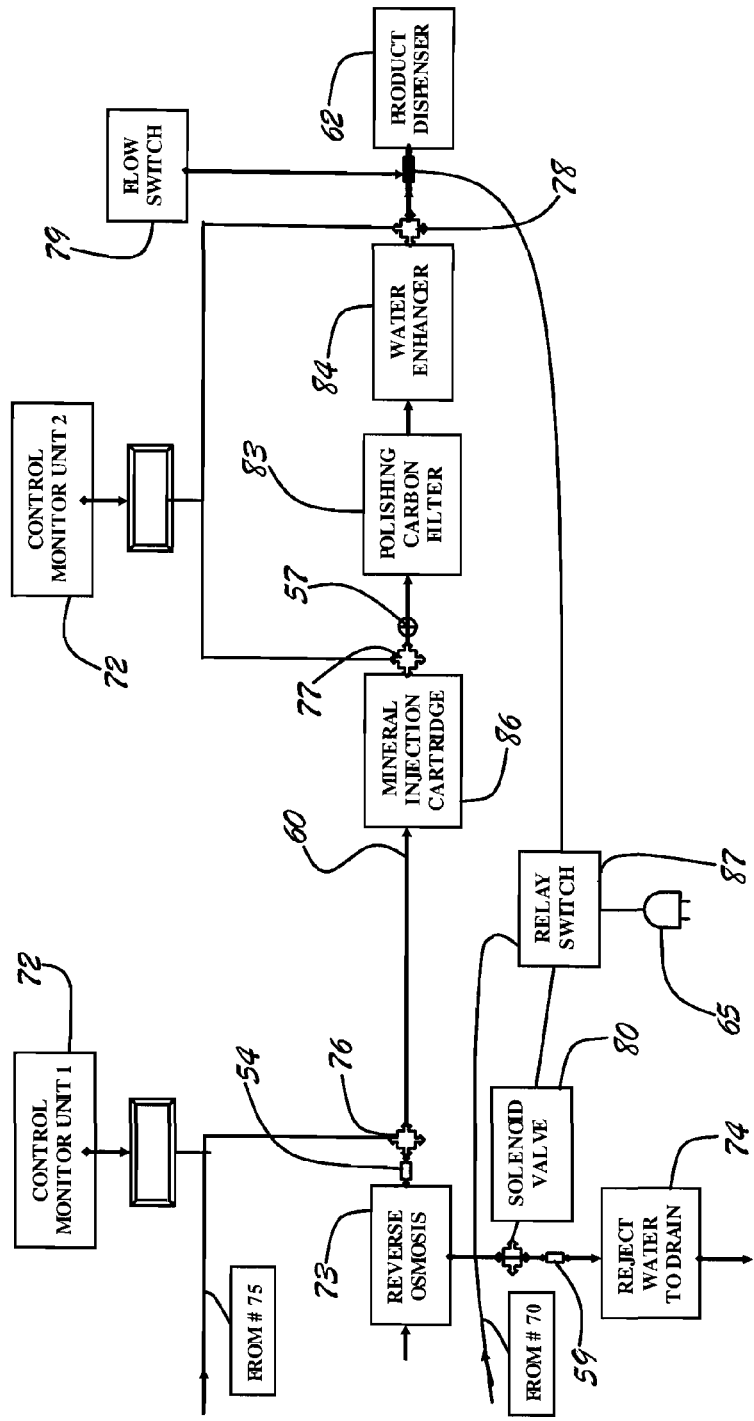
FIG. 14 PART 2

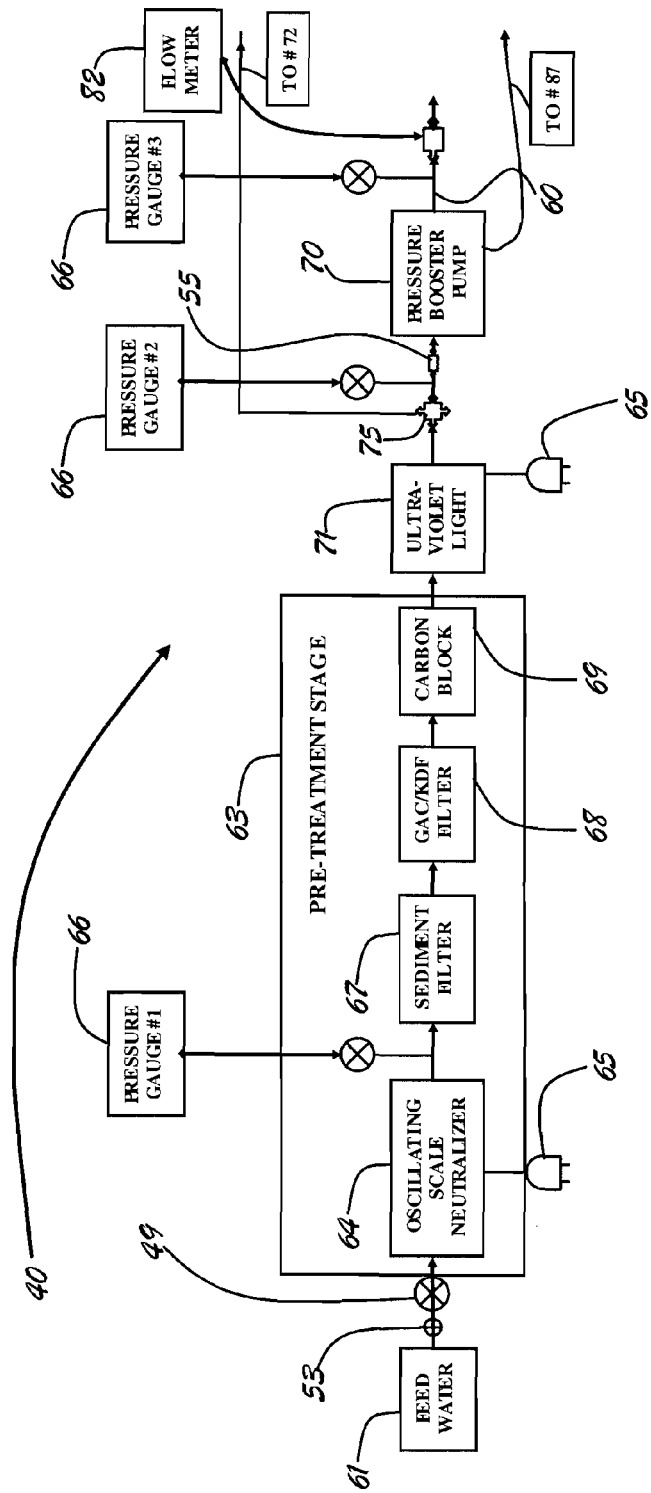
FIG. 15 PART 1

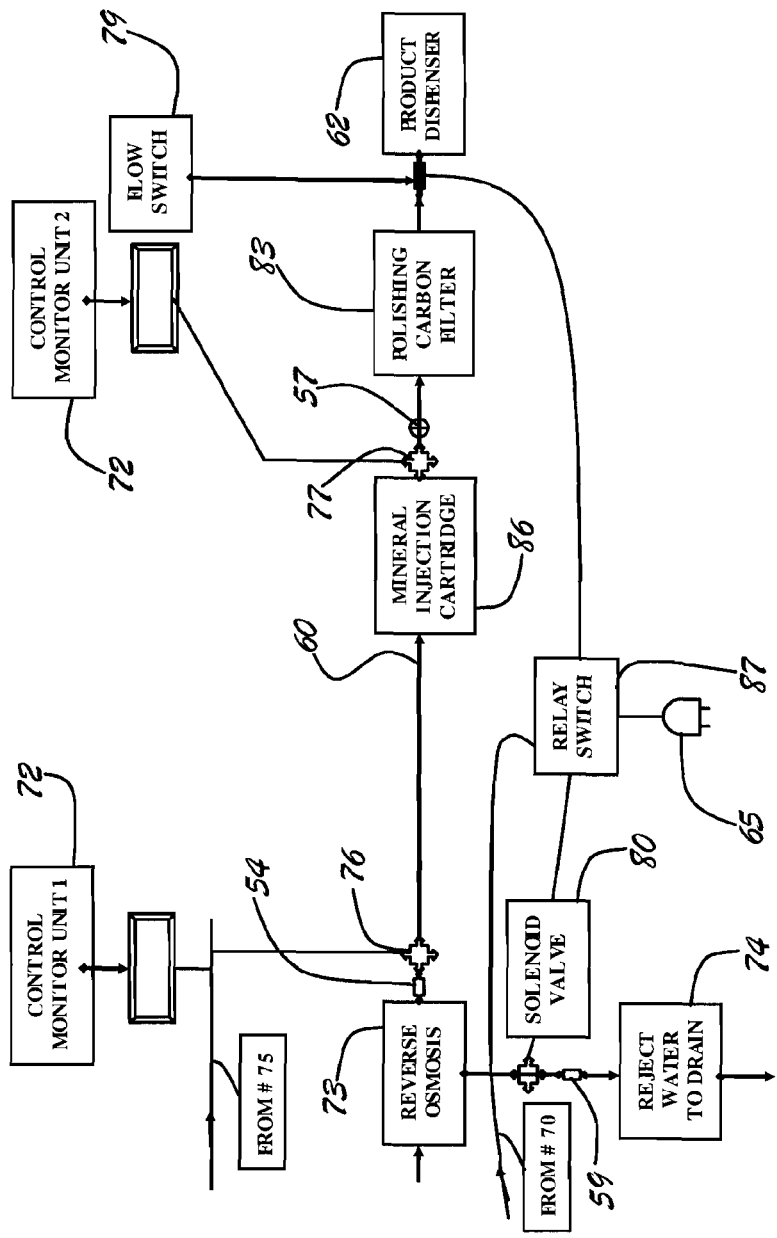
FIG. 15 PART 2

PART 1

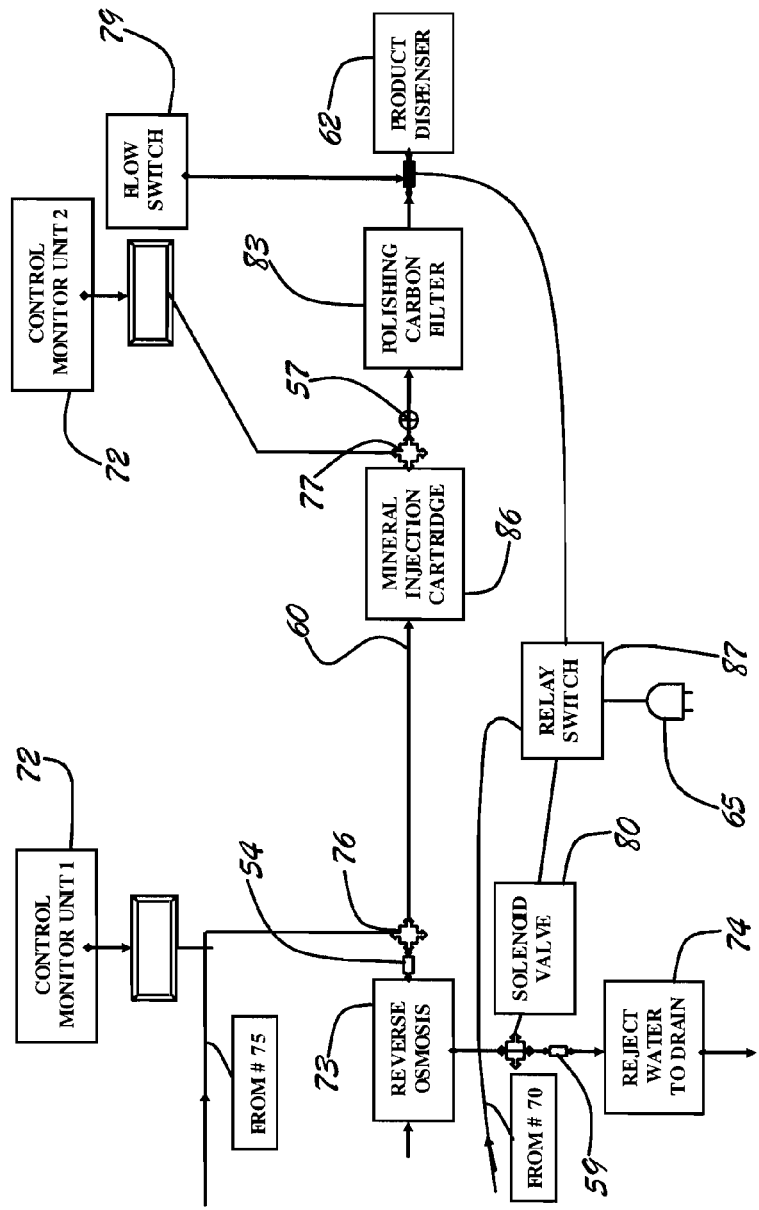
FIG. 16 PART 2

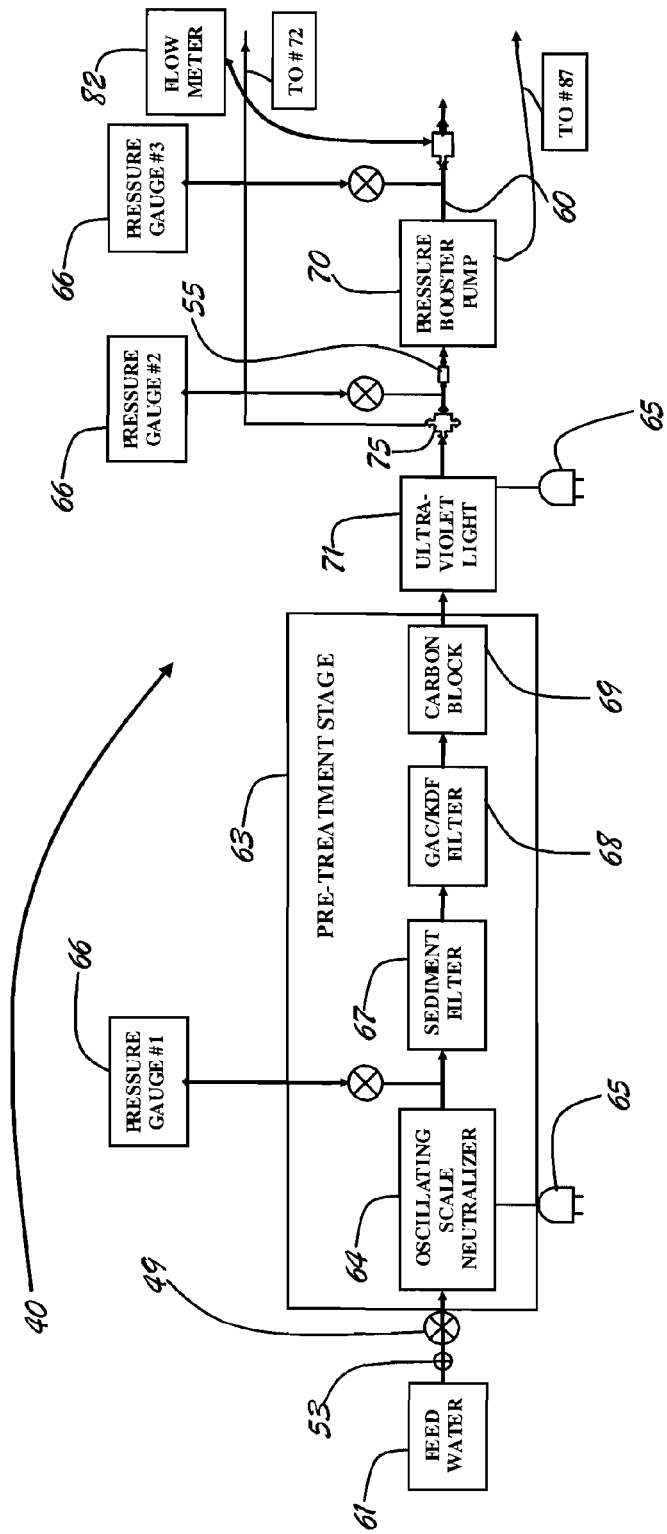

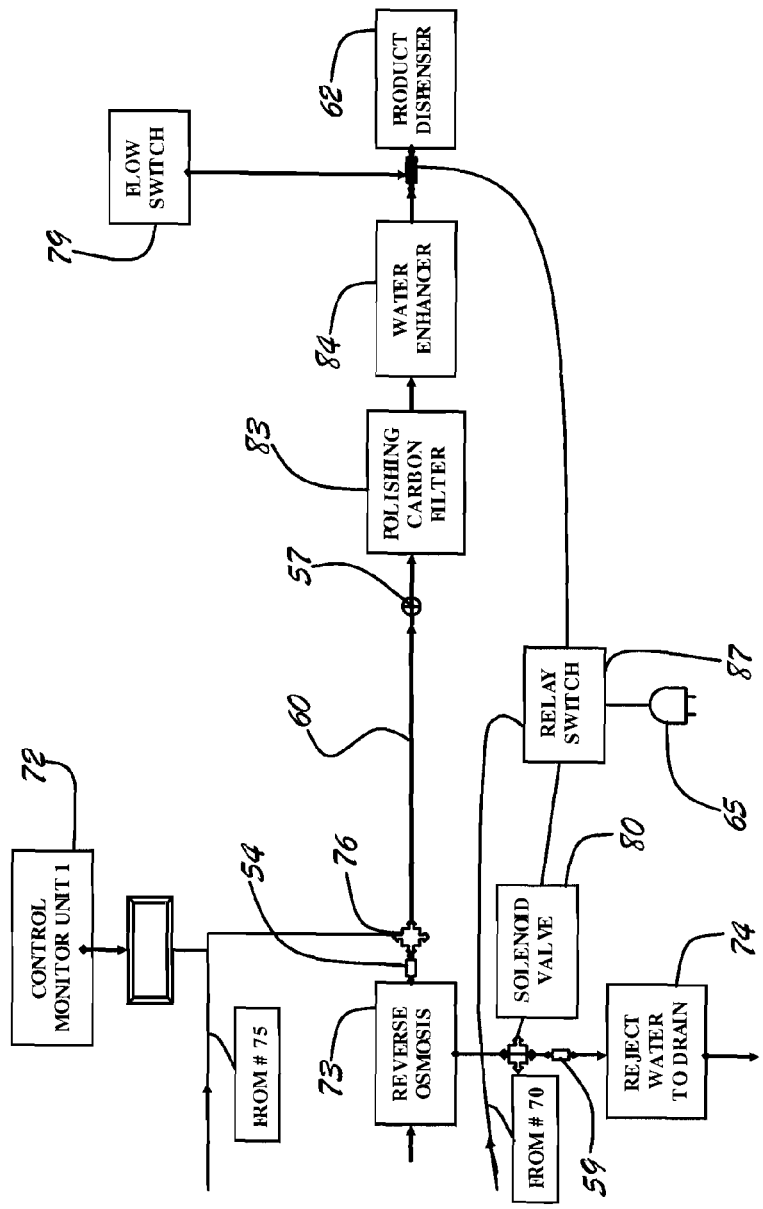
FIG. 17 PART 2

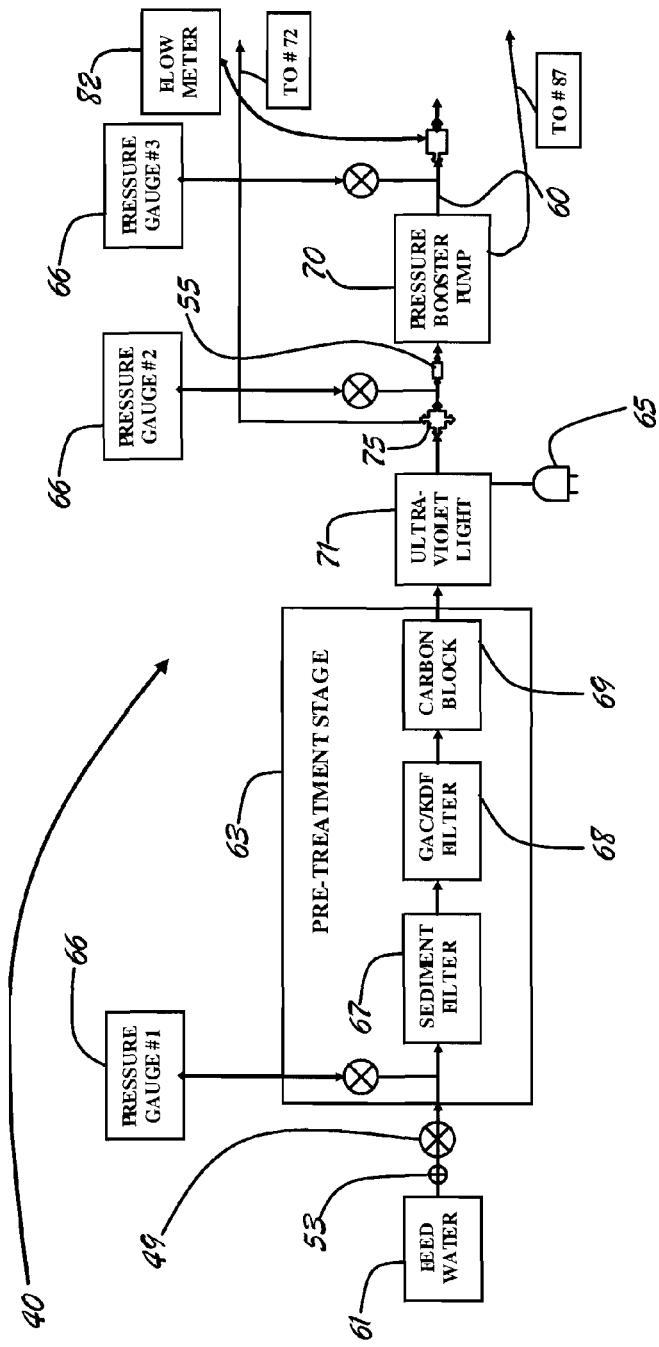
FIG. 18 PART 1

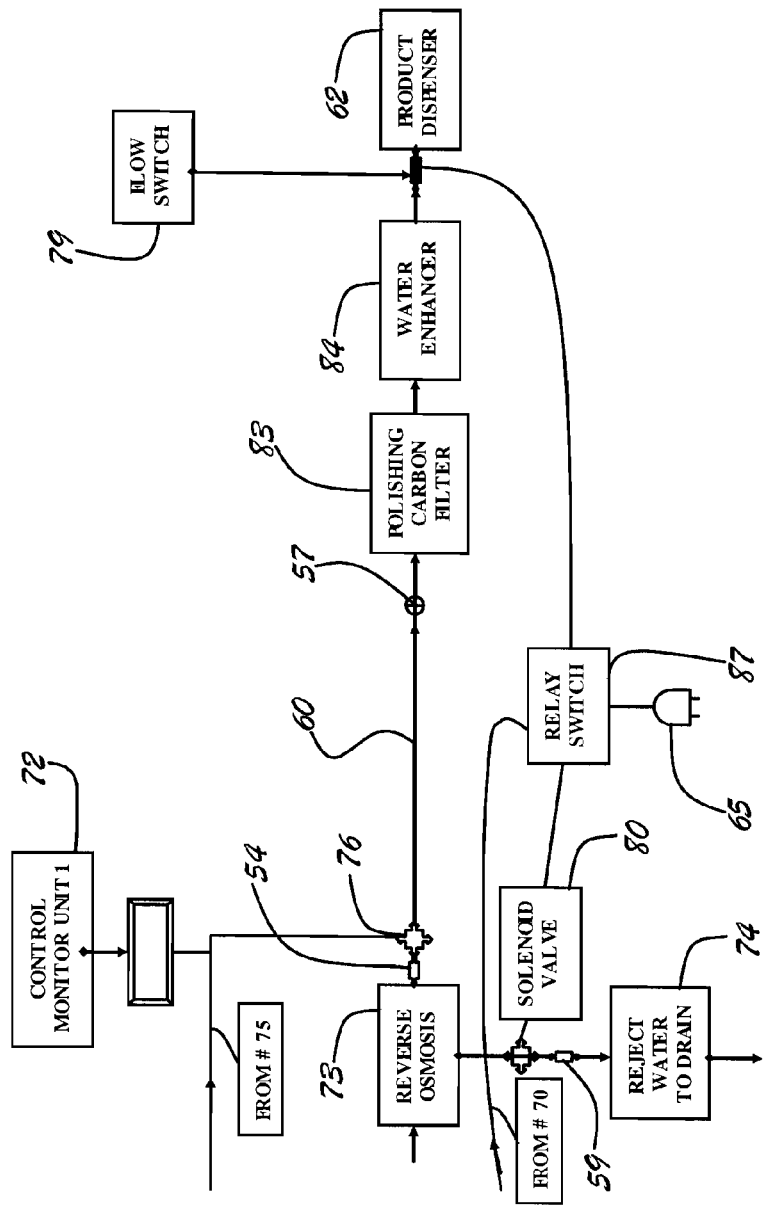
FIG. 18 PART 2

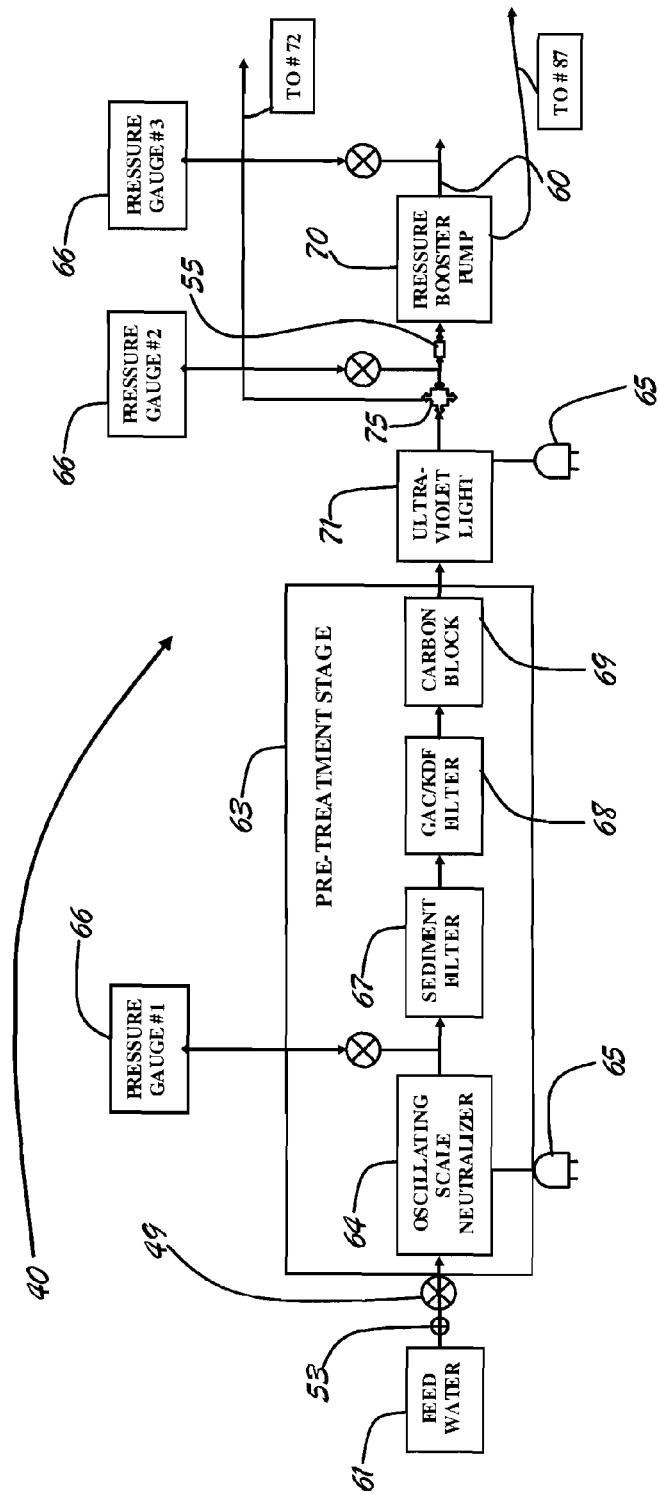
FIG. 19 PART 1

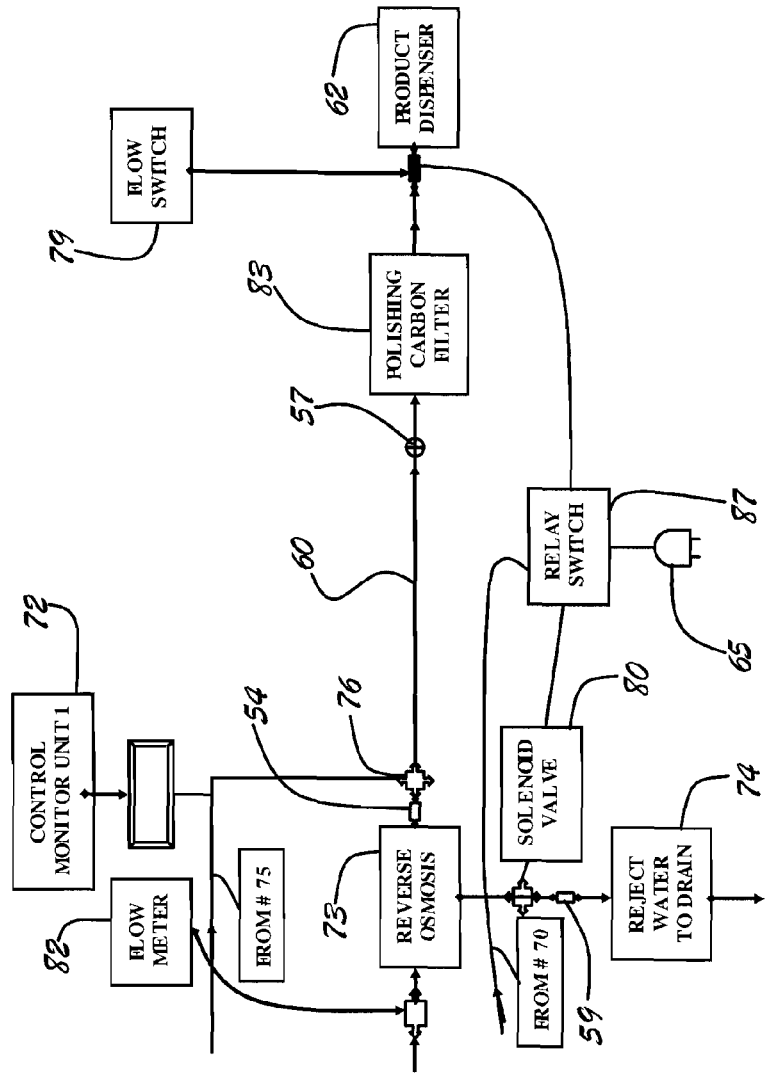
FIG. 19 PART 2

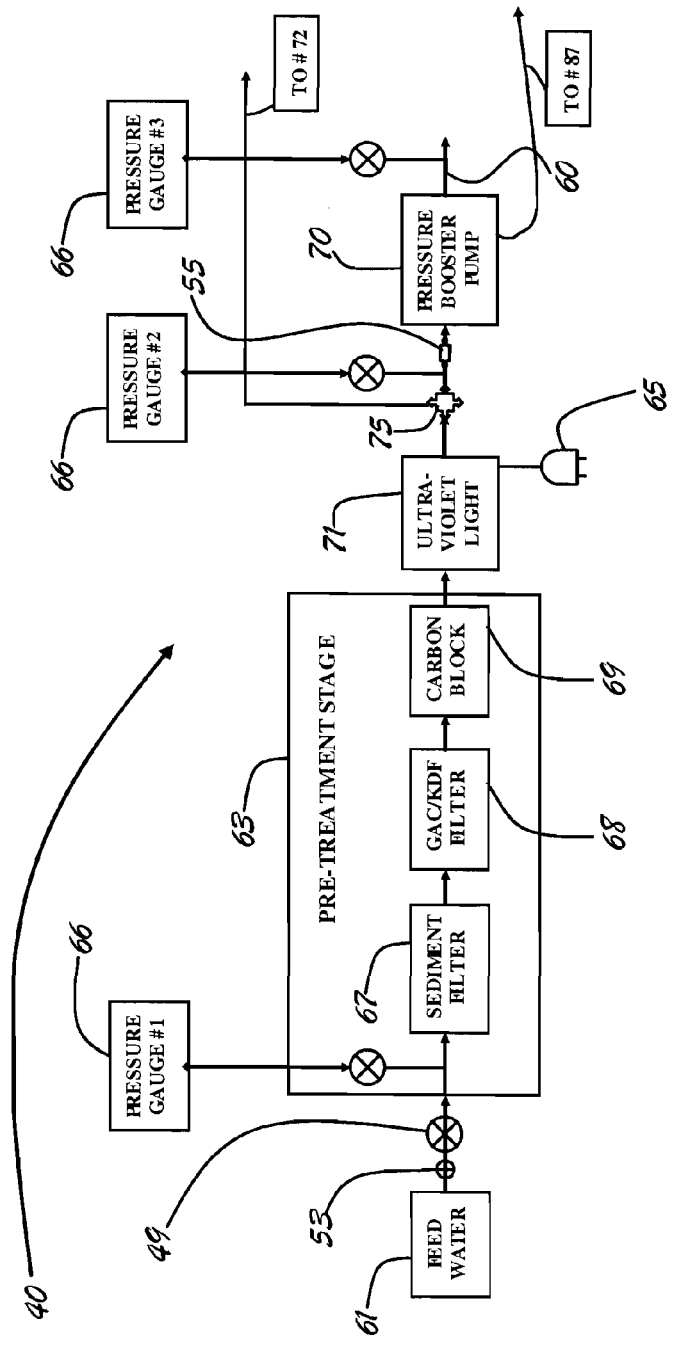
FIG. 20 PART 1

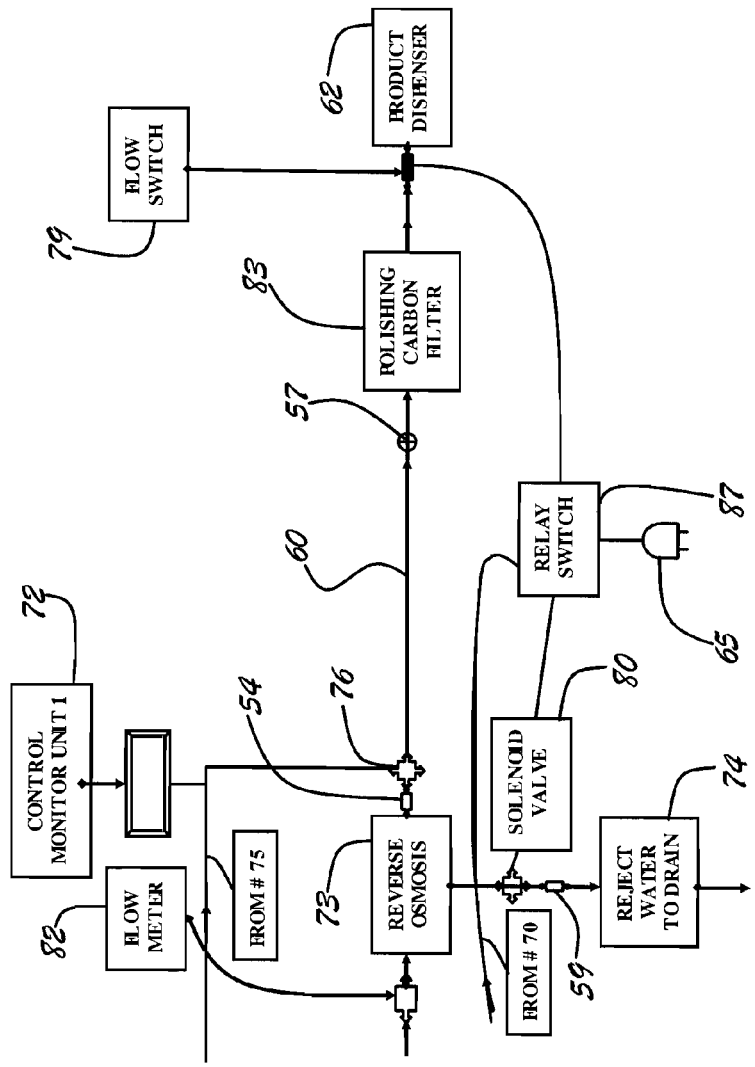
FIG. 20 PART 2

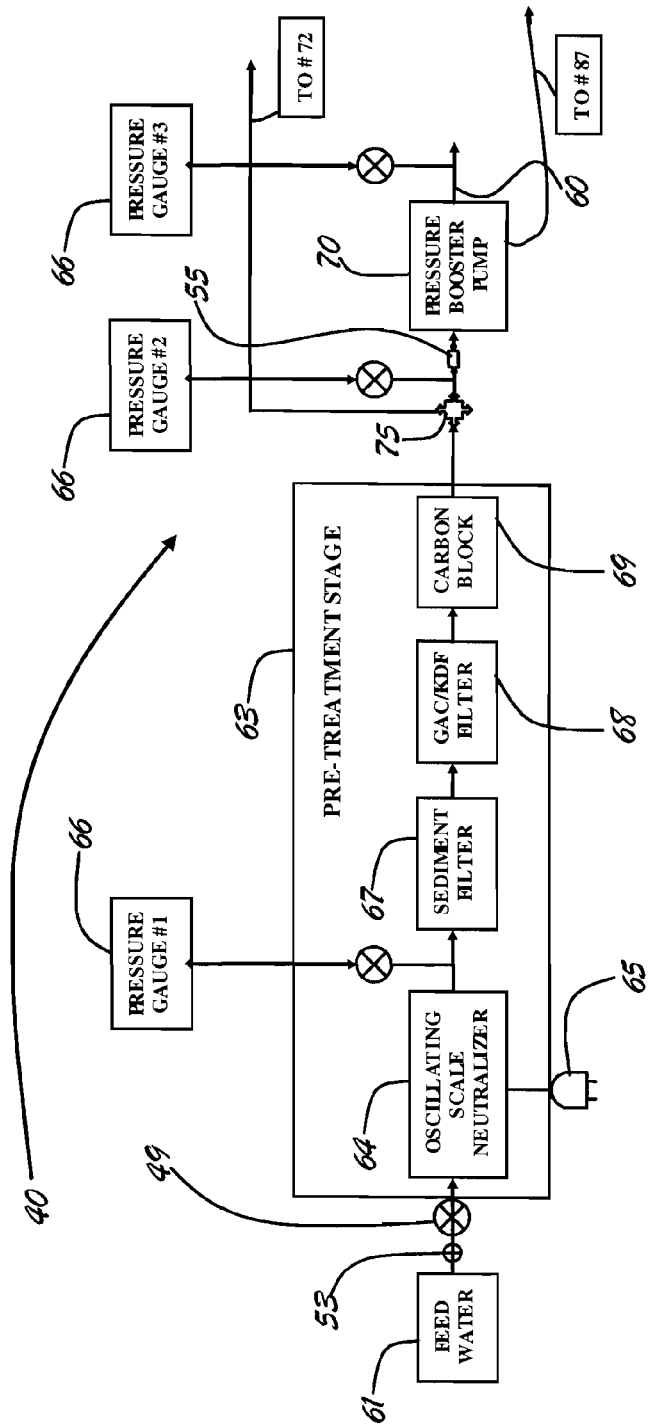
FIG. 21 PART 1

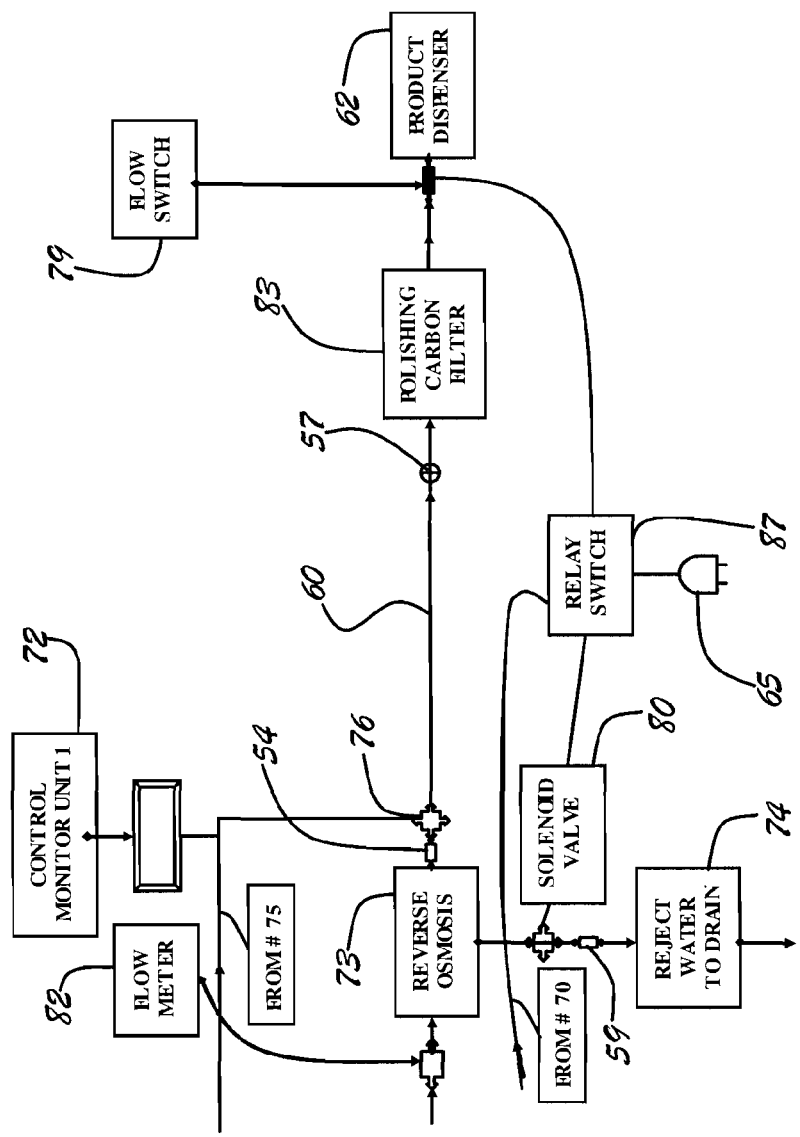
FIG. 21 PART 2

PART 1

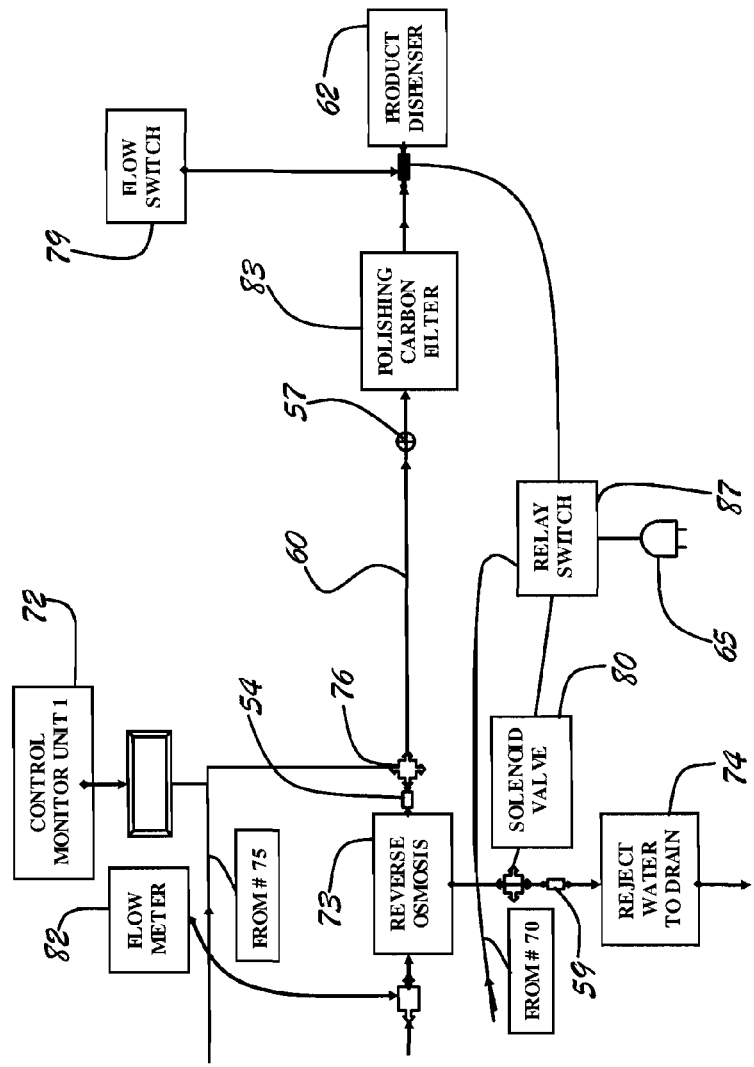
FIG. 22 PART 2

WATER PURIFICATION, ENHANCEMENT, AND DISPENSING APPLIANCE

CROSS REFERENCE TO RELATED APPLICATIONS

This application claims the benefits of U.S. Provisional Application No. 61/004,691, filed Nov. 28, 2007, the disclosure of which is hereby incorporated by reference in its entirety including all figures, tables and drawings.

STATEMENT REGARDING FEDERALLY SPONSORED RESEARCH OR DEVELOPMENT

Not applicable

REFERENCE TO SEQUENCE LISTING, A TABLE, OR A COMPUTER PROGRAM LISTING COMPACT DISC APPENDIX

Not applicable

BACKGROUND OF THE INVENTION

The invention relates to the purification of water and in particular to the arrangement of a purification system in relation to the framework, modular construction, apparatus, cabinet/enclosure, and method of producing high-purity, enhanced laboratory-quality water including diagnostic, control, and water monitoring capabilities.

A variety of water purification and treatment systems have been described in an attempt to address the many needs of those seeking pure, clean, healthy water (see for example, U.S. Pat. Nos. 4,460,472; 4,587,518; 4,784,763; 5,006,234; 5,038,091; 5,597,487; 5,865,991; and 5,915,851 and U.S. Published Patent Application Nos. 2006/0213821; 2006/0219613; and 2006/0226081). A need remains however for a water purification and treatment system that compact, user friendly and will produce a superior product.

BRIEF SUMMARY OF THE INVENTION

The invention involves a water purification and enhancement system designed as a built-in appliance located under the countertop or as a free-standing (stand alone) unit. The water appliances modular design allows for flexibility in the selection of various options including interfacing with a central controller directed to a computerized system for the monitoring and controlling of remote devices (grey water recycling, water usage, water diagnostic sensors, etc.) by transmitting data between the remote systems and a gateway interface. The central controller can be conveniently located on the front panel of the water appliance, integrated into the kitchen as a wall mount, or as a build-in at another location. The water appliance can be aesthetically integrated within the kitchen by the appropriate selection of paneling and cabinetry.

A unique combination of water treatment elements provides highly purified enhanced water at between 1.5 to 2.5 liters per minute with or without the use or need of a water storage holding tank. These elements include pre-treatment filters, ultraviolet radiation, reverse/osmosis treatment, deionization, mineral injection, polishing filters and water enhancement. The purified/enhanced water product can pass through an instant hot water dispenser and/or a water chiller supplying the consumer with the option of either hot water, cold water, or tepid water.

BRIEF DESCRIPTION OF THE SEVERAL VIEWS OF THE DRAWING

FIG. 7 is a schematic view of an alternative embodiment of a water purification system in accordance with the principles of the invention;

FIG. 9 is a schematic view of an alternative embodiment of a water purification system in accordance with the principles of the invention;

FIG. 10 is a schematic view of an alternative embodiment of a water purification system in accordance with the principles of the invention;

FIG. 13 is a schematic view of an alternative embodiment of a water purification system in accordance with the principles of the invention;

FIG. 14 is a schematic view of an alternative embodiment of a water purification system in accordance with the principles of the invention;

FIG. 15 is a schematic view of an alternative embodiment of a water purification system in accordance with the principles of the invention;

FIG. 17 is a schematic view of an alternative embodiment of a water purification system in accordance with the principles of the invention;

FIG. 18 is a schematic view of an alternative embodiment of a water purification system in accordance with the principles of the invention;

FIG. 19 is a schematic view of an alternative embodiment of a water purification system in accordance with the principles of the invention;

FIG. 20 is a schematic view of an alternative embodiment of a water purification system in accordance with the principles of the invention;

FIG. 21 is a schematic view of an alternative embodiment of a water purification system in accordance with the principles of the invention;

DETAILED DESCRIPTION OF THE INVENTION

Although the invention will be described next in connection with certain embodiments, the invention is not limited to practice in any one specific type of water purification systems. It is contemplated that the invention can be used with a variety of water purification and filtration arrangements and the description of the invention is intended to cover all alternatives, modifications, and equivalent arrangements as may be included within the spirit and scope of the invention. In particular, those skilled in the art will recognize that the components of the invention described herein could be arranged in multiple different ways. Key to the uniqueness of the invention is the framework and arrangement of the water purification components designed and enclosed into a cabinet of modular construction and utilized as a built-in-appliance to be located under the countertop or as a free-standing (stand alone) water appliance. It is also contemplated that the invention can be utilized with a variety of latching mechanisms securing front panel of appliance and the description of the invention is intended to cover all alternatives, modifications, and equivalent arrangements including alterations in dimensions as may be included within the spirit and scope of the cabinetry of the water appliance invention.

Figure 1:
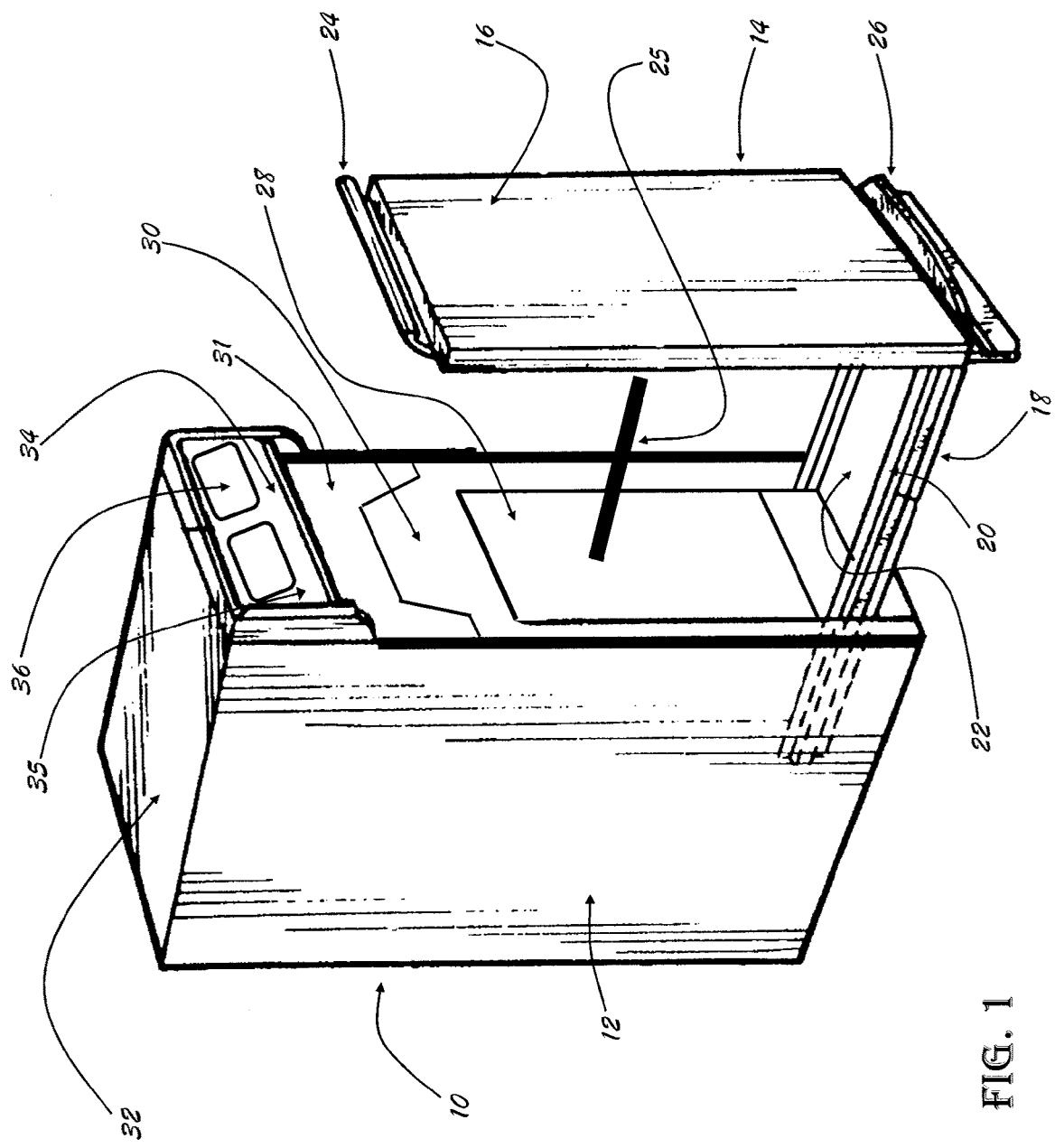
FIG. 1 is a schematic view of the framework, modular construction, apparatus, and cabinet/enclosure of the water purification system or water appliance in accordance with the principles of the invention.
Figure 2:
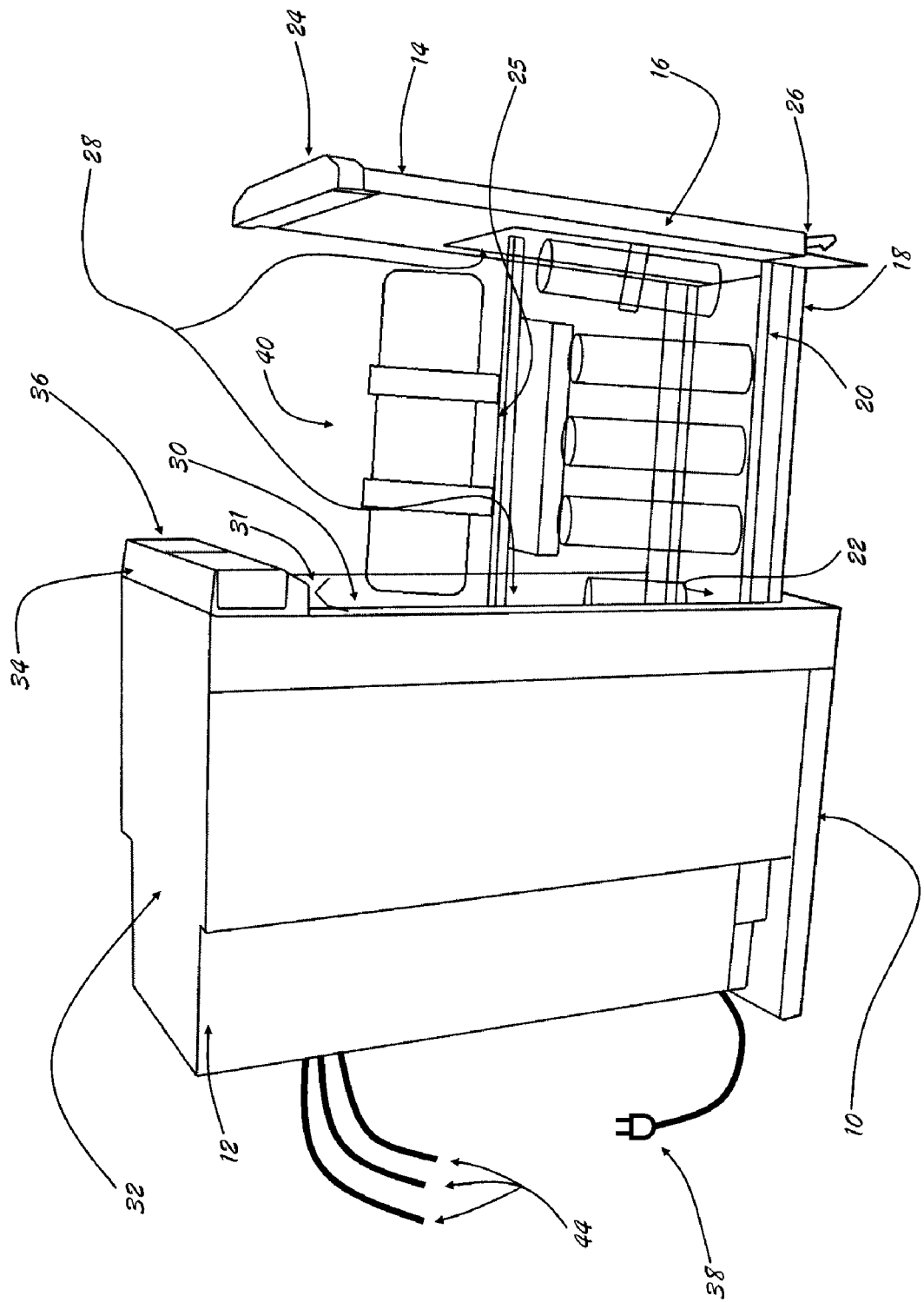
FIG. 2 is a schematic side view of the framework, modular construction, apparatus, and cabinet/enclosure of the water purification system or water appliance in accordance with the principles of the invention.

FIG. 1 and FIG. 2 illustrate the cabinetry and function of the water appliance 10 and its similarity in size and dimension to a conventional refuse compactor taking into consideration the simplicity of pre-existing conventional carpentry and cabinetry dimensions for under the counter installation. The water appliance 10 comprises a generally rectangular cabinet 12 which encloses a drawer assembly 14 translatable along guide rails 20 in a drawer-like fashion through an opening 30 in the front wall 31 of the cabinet 12 to situate the receptacle 14 selectively in either the FIG. 1 open position for access to the purification system 40 FIG. 2 or closed position within the cabinet 12. The receptacle 14 is integral with and manually controlled by means of a hand grasp 24 mounted on a front drawer panel 16 utilizing either a foot control latch release 26 (U.S. Pat. No. 4,081,148) or latch release mounted on front drawer panel 16. A control panel 34 is mounted or attached on the upper portion of the front wall 31 for diagnostics and monitoring of water purification system 40 FIG. 2. The control panel 34 includes water monitoring meters 36 for water quality and diagnostics of component efficiency or failure. Wired technology as well as wireless remote technology designed into control panel 34 is contemplated for both monitoring and control of water purification system 40 and also including but not limited to the monitoring and control of a variety of other water related components, systems, or applications. FIG. 1 and FIG. 2 interior of cabinet drawer assembly 14 consists of front and rear water purification component mounting panels 28 and component mounting frame 25 supported by a deck 18 on which receptacle 14 rests and is attached to the lower portion of the drawer front panel 16. Drawer 14 is movable into and out of cabinet 12 on horizontal rails 20 by means of hand grasp 24. The unique design and construction of drawer assembly 14 augments accessibility of water purification system 40 facilitating service and diagnostics of components. Drawer deck 18 is utilized as drip pan 22 for water filter changes or water leak during routine maintenance. Cabinet lid 32 is designed to be removable and accessible in the event entrance is needed to interior of water appliance 10. The drawer front panel 16 can be aesthetically integrated into the kitchen by the appropriate selection of paneling and cabinetry.

Figure 3:
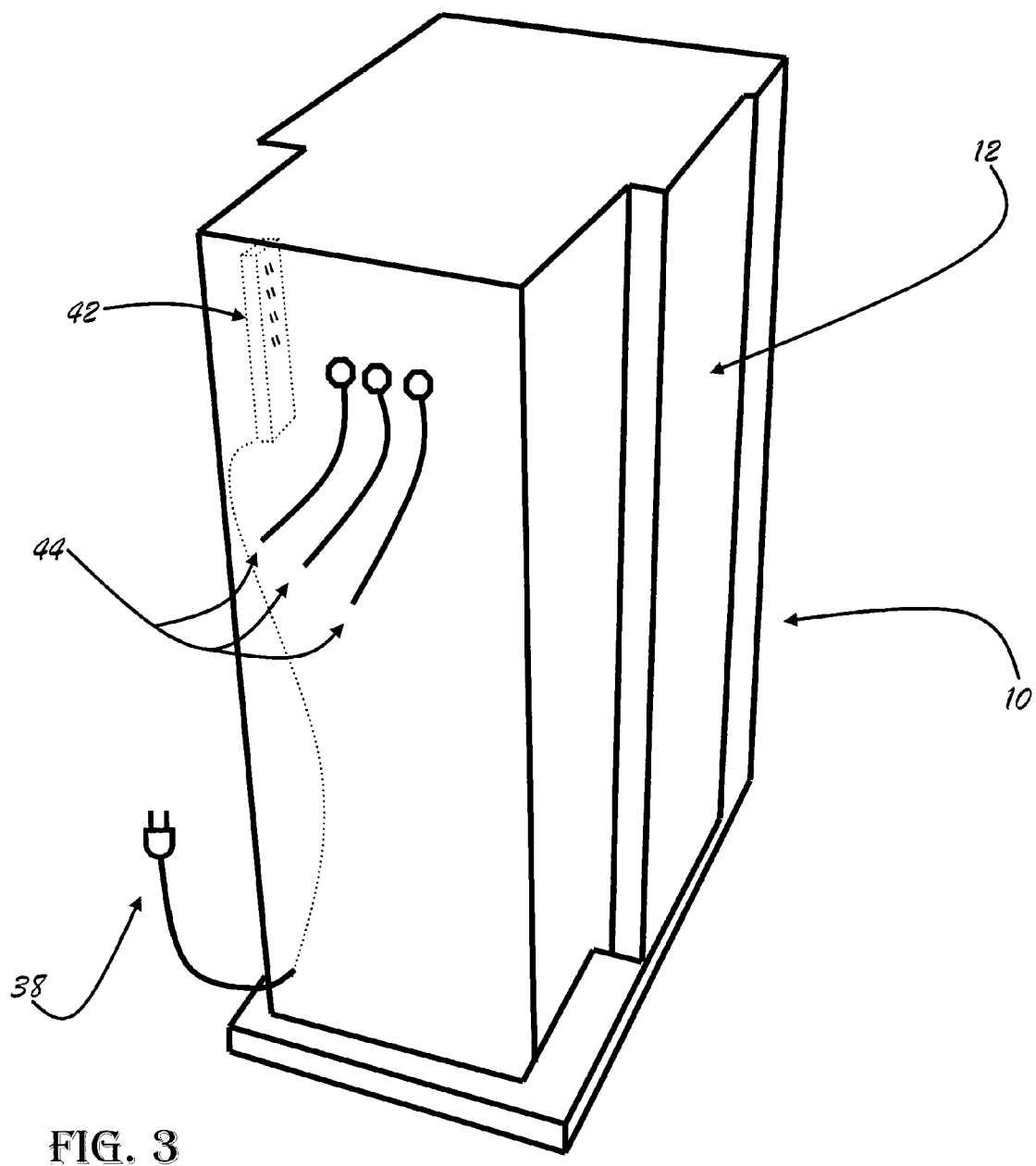
FIG. 3 is a schematic rear view of the framework, modular construction, apparatus, and cabinet/enclosure of the water purification system or water appliance in accordance with the principles of the invention.

FIG. 3 illustrates rear view of water appliance 10 comprising a generally rectangular cabinet 12. Water lines or tubing 44 are one feed water line 61 FIG. 5 supplying water to purification system 40 FIG. 2 and FIG. 5 one line of reject water to grey water drain 74 FIG. 5, and one line to product dispenser 62 FIG. 5, such as a tap or a faucet to dispense the product water. As shown in 38 FIG. 2 and 38 FIG. 3 power chord extending from water appliance 10 from surge protected power strip 42 or similar multiple power outlet for activation or energizing of electrical water purification components.

Figure 4:
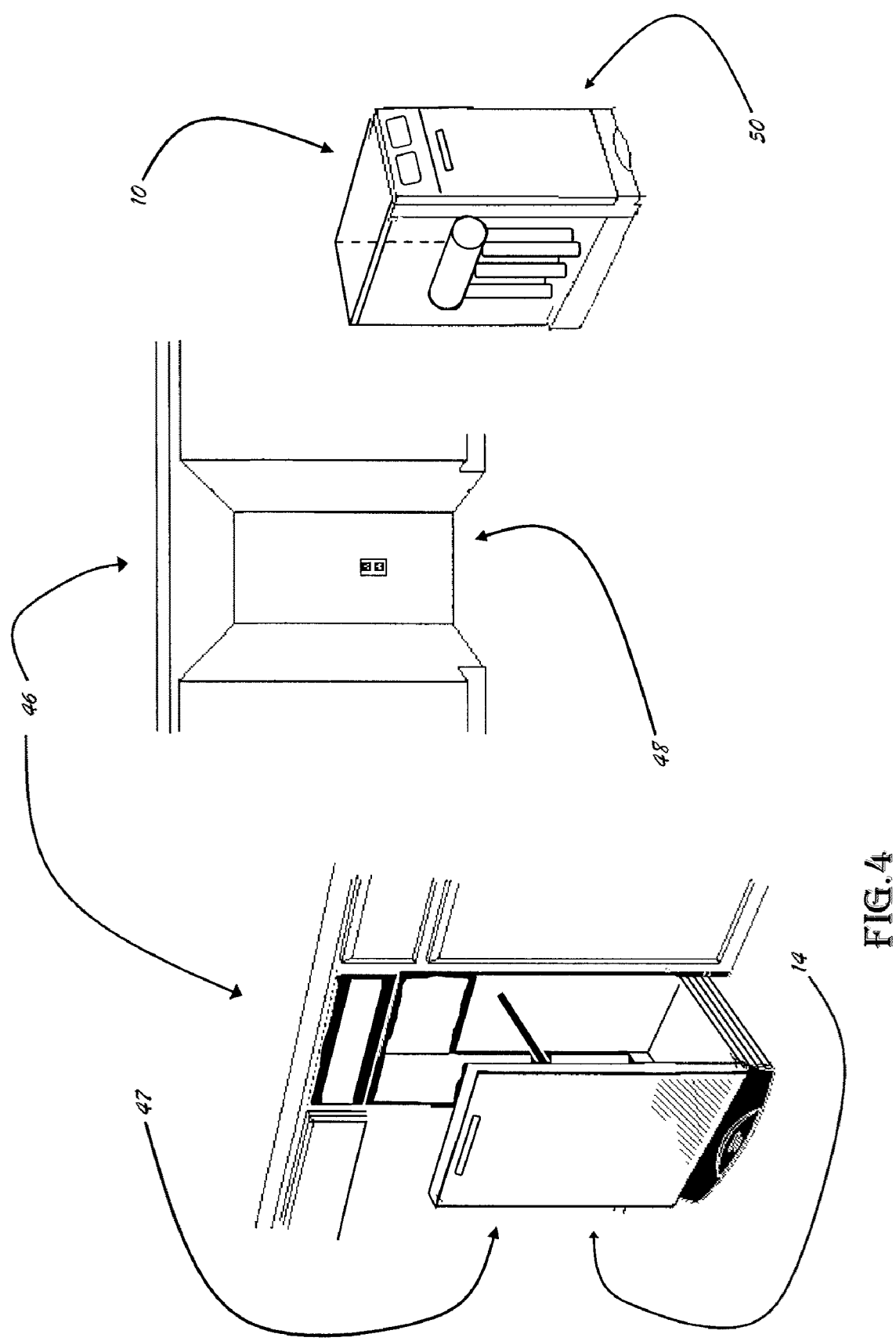
FIG. 4 is a schematic view of the under the counter installation of the cabinet/enclosure and free standing cabinet/enclosure of the water purification system in accordance with the principles of the invention.

With reference to FIG. 4, illustration of water appliance 10 with general dimensions 50 shown for both under the counter or stand alone applications and is intended but not limited to cover all alternatives, modifications, and equivalent arrangements including alterations in size, shape, and dimensions as may be included within the spirit and scope of the cabinetry of the water appliance invention. As illustrated in FIG. 1, FIG. 2, FIG. 3, and FIG. 4 the cabinetry and function of the water appliance 10 and its similarity in size and dimension to a conventional refuse compactor taking into consideration the simplicity of pre-existing conventional carpentry and kitchen cabinetry for under the counter installation. With illustrations in FIG. 4 again depicting overall general dimensions 48 for under the counter installation 46 of water appliance 10 and again alterations in size, shape, and dimensions are contemplated as applicable within the spirit and scope of the invention. As depicted in 47 the under the counter installation 48 illustrates open position of drawer assembly 14 for access to the purification system FIG. 2, 40. Drawer assembly 14 and arrangement of purification components FIG. 2, 40 of water appliance 10 is intended and designed to allow for ease and convenience of serviceability of water purification system. Higher serviceability will improve ease of access, consumer friendliness, compatibility, and reduction of service cost.

Figure 5:
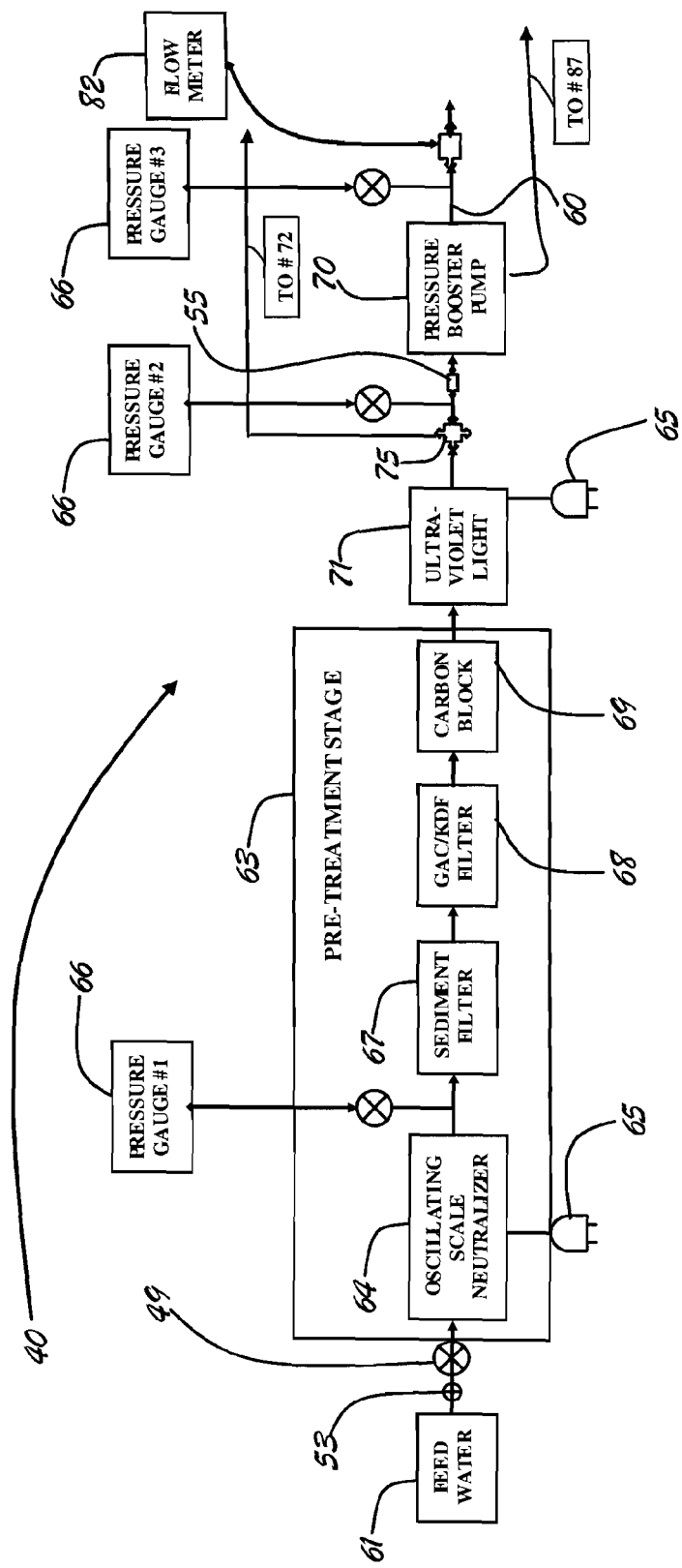
FIG. 5 is a schematic view of the preferred embodiment of the water purification and enhancement system in accordance with the principles of the invention.

Turning now to FIG. 5, of the exemplified embodiment of water purification system 40 according to the purification principles of the water appliance invention 10 for producing high-purity product water includes a shutoff valve 53 on inlet feed water source 61, leak control and detection system 49, with auto shut-off of feed water if leak is detected, either AC or DC capable a pre-treatment (PT) state 63, a ultra-violet (UV) light 71, conductivity monitor 72 unit 1, pressure gauges 1 & 2, 66, booster pump 70, pressure gauge 3, 66, a flow meter 82, a reverse osmosis (RO) unit 73, a grey water drain 74, a de-ionization (DI) unit 81, conductivity monitors 72 unit 2, a flow switch 79, a solenoid valve 80, a relay switch 87, blending loop 85, mineral injection unit 86, conductivity monitor 72 unit 3, a publishing filter 83, and a water enhancer unit 84, which are collectively coupled in fluid communication. A stream of feed water is provided from a feed water source 61 to the PT stage 63 by ½" (half inch) OD tubing which provides for sufficient fluid flow rate and a stream of the high-purity enhanced product water produced by the water purification system 40 is transferred by ⅜" (three eights inch) OD tubing which provides sufficient fluid flow rate to a product dispenser 62 such as a tap or a faucet used to dispense the high purity enhanced water product. The mechanical filtering and dispensing components FIG. 5; (67, 68, 69, 81, 83, 86), incorporated in the embodiment of invention are of the encapsulated type and design and are particularly utilized in this embodiment because of better capacity and flow rate, the size and style of housings, the convenience of changing the filters, and the overall improved environment of system sanitation while servicing providing for a reduction of possible contamination.

In the embodiment FIG. 5 after shut-off valve 53 and before (PT) stage 63 is the leak control and detections system 49, for the purpose of automatically shutting water feed 61 supply off if any water leaks are detected by sensor. If water is detected then a signal is transmitted to valve to shut feed water 61 off. Current system utilizes both alarm and LED indicator, but it is the inventors intention that the description of leak control system 49 is intended to cover all alternatives, modifications, and equivalent arrangements as may be included within the spirit and scope of the water appliance invention.

The initial component of PT stage 63 of water purification system 40 is the scale neutralizer 64, which is a non-chemical, electronic device for removing and preventing deposits of scale on surfaces that come in contact with hard water. 'Hard water' is defined as water containing a supersaturated quantity of one or more minerals. The mineral overwhelmingly responsible for scale is calcium carbonate ($CaCO_3$). In addition to composing the majority of scales, calcium carbonate also traps other minerals such as magnesium to form combined scales. The scale neutralizer 64 is designed to continuously prevent scaling without any maintenance and with no impact whatsoever on the environment or on human health. The scale neutralizer 64 consists of two principal components: (1) a control unit containing a microprocessor that creates a square-wave electric current that rapidly sweeps a broad range of frequencies; and (2) one or more signal cables that carry this current and that wrap multiple times around the exterior wall of a pipeline positioned in fluid line 60 between the feed water source 61 and the PT stage 63 to form one or more solenoid induction coils. This arrangement induces a modulating electric field that encompasses the moving water stream and that prevents scaling which in turn improves RO unit 73 membrane efficiency by preventing premature failure due to scaling. The scale neutralizer 64 utilized in invention was acquired from Clearwater Enviro Technologies Inc. 1166 Kapp Drive. Clearwater Fla., 33765.

In the embodiment FIG. 5, the primary pressure gauge #1 66 is positioned after scale neutralizer 64 and before the sediment filter 67, with secondary pressure gauge #2 66 positioned between conductivity cell 75 and booster pump 70. Primary gauge #1 66 indicates feed line pressure and secondary gauge #2 66 indicates post line pressure of the PT stage 63 and is utilized as an indicator of filter fouling or clogging, signifying the need of servicing and replacement of pre-filters in PT stage 63. It is the inventors intention that the description of the PT stage 63 including filter failure and line pressure indicators is intended to cover all alternatives, modifications, and equivalent arrangements as may be included within the spirit and scope of the water appliance invention. This is also intended to include but not be limited to utilization of microprocessing technology both of wireless remote sensing or wired circuitry of electronic monitors, relays, circuit boards, and/or other types of indicators.

The filtration process of the PT stage 63 is operative for removing particulate matter, organic compounds, free chlorine/chloramines and other halogens. Specifically, PT stage 63 consists of depth filtering with a sediment filter 67, a granulated activated carbon (GAC)/KDF filter 68, and a extruded carbon block filter 69. Again the filters utilized in invention are of the encapsulated type and design and are particularly utilized in this embodiment because of the better capacity and flow rate, size and style of housings, convenience and ease of changing, and the overall improved environment of system sanitation.

The first of the pre-treatment filters that feed water 61 passes into is sediment filter 67 which incorporates either a tortuous, random matrix of small fibers, such as cotton, cellulose, synthetic yarns, or melt blown polymer fibers, through which the feed water supplied from feed water source 61 passes and upon which particulate matter suspended in the feed water is captured. Next the water flows into the GAC/KDF 68 filter element of PT stage 63. The GAC part of filter 68 is utilized for the absorption and filtering of organic compounds, free chlorine and other types of halogens from the feed water stream. KDF process media are high-purity copper-zinc formulations utilized in the PT stage 63 of the water appliance 10 invention for pretreatment helping extend system life by reducing heavy metals, microorganisms, scale, and lowering maintenance cost. The KDF-85 that is utilized in the GAC/KDF 68 filter helps to remove or reduce iron and hydrogen sulfide from municipal or other water supplies and is effective in controlling the buildup of bacteria, algae, fungi and scale, making KDP-85 ideal for use in GAC beds. The carbon block filter 69 immediately follows the GAC/KDF 68 as a secondary carbon filter for further removal of organic compounds, free chlorine, and other halogens before entering the RO unit 73 thus adding to the improvement of RO membrane efficiency and service life.

The next component the filtered water from PT stage 63 enters is the ultra-violet UV light 71. The ultraviolet UV unit 71 channels the water past a submerged lamp which emits a lethal doses of UV energy, destroying pathogens. When bacteria, viruses, and other microorganisms are exposed to the germicidal UV light at a particular wavelength (253.7 nanometers) their reproductive capabilities are destroyed, which means that they are inactivated and no longer pose a threat to human health. The effectiveness of the UV unit 71 in eliminating microbiological contamination is directly dependent on the physical qualities and/or clarity of the water supply. Part of the pre-treatment PT stage 63 design function is for improvement of the clarity of the water by the reduction of suspended solids or particulate matter. The UV unit 71 incorporates premature lamp failure or alarm signal indicator warning if the apparatus is producing water that does not meet the desired criteria for disinfection of the filtrate stream. This sterilization process also adds to the extension of RO unit 73 membrane life by reducing bio-fouling from microbial pathogens.

Figure 8:
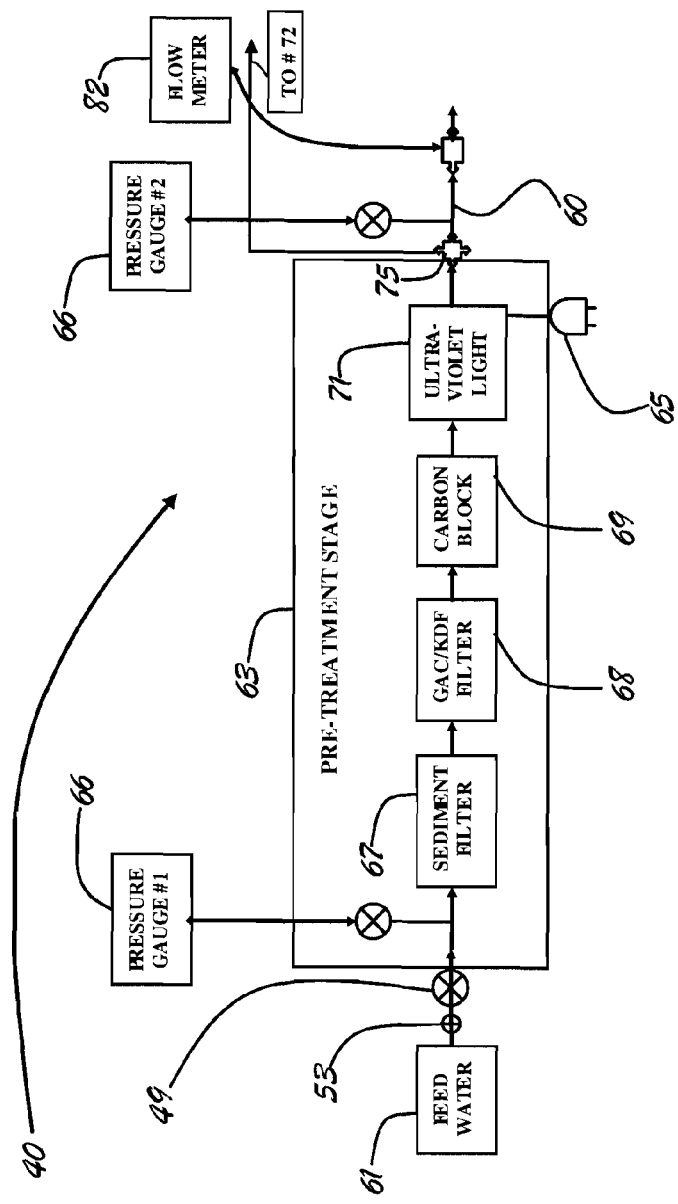
FIG. 8 is a schematic view of an alternative embodiment of a water purification system in accordance with the principles of the invention.

The sterilized filtrate water then flows through conductivity cell 75 which will be described in the following paragraphs and secondary pressure gauge #2 66 which has already been previously described. The filtrate water enters into the booster pump 70 which on present invention is located between secondary pressure gauge #2 66 and inlet of flow meter 82 but is contemplated that the booster pump 70 could also be located or arranged in any position after the sediment filter 67 within PT stage 63 before fluid line 60 feeds into RO unit 73. Filtration and reduction of particulates of feed water source 61 prior to entry of booster pump 70 insures protection of pumping mechanism and improvement of component longevity. The booster pump elevates water pressure and flow rate of the filtrate stream to a suitable operating pressure so as to provide an adequate driving force for the operation of the RO unit 73. Check valve 55 is positioned after secondary pressure gauge #2 66 and inlet of booster pump 70 to prevent backpressure on feed water 61 and loss of pressurization of pump. In current embodiment of invention the type of booster pump 70 utilized is a rotary vane pump. Typically, in preferred embodiment the operating pressure of pump 70 is in the range of 120 psig to 140 psig. In the embodiment FIG. 5, pump pressure gauge #3 66, designated for indication of pump pressure and positioned after booster pump 70 and before flow meter 82. Not all applications of water appliance invention will require booster pump if sufficient pressure and flow rates are available, although for production purposes of the preferred embodiment a booster pump will most likely be utilized for consistency of water production and flow rate. FIGS. 7 and 8 show alternate embodiment of invention without booster pump. It is contemplated by inventor that some variations may be utilized on different models of invention including different styles and/or types of pumps and is intended but not limited to cover all alternatives, modifications, and equivalent arrangements as may be included within the spirit and scope of the water appliance invention.

After exiting the booster pump 70 the water flows through the digital flow meter and filter life monitor 82, currently located after booster pump 70. The flow meter 82 utilized in the embodiment integrates accumulated flow volume with used time to monitor filter life combining real time flow rate and accumulated volume with indicated measurement digitally displayed on LCD monitor. Once accumulated volume of consumed product water reaches capacity of purification system 40 PT stage 63 filters or used time reaches preset value, flow meter 82 displays warning icon on LCD monitor and emits audio alarm alerting consumer of need of filter change or service. It is also contemplated that the description and location of flow meter 82 including alternative remote sensors, relays, and/or indicators for both flow rate and accumulated volume may be utilized and is inclusive of the description of the inventions water monitoring capabilities and is intended to cover all alternatives, modifications, and equivalent arrangements as may be included within the spirit and scope of the water appliance invention.

The filtrate water stream now enters into the reverse osmosis unit 73 of water purification system 40, comprising a reverse osmosis filter element and membrane housing having an inlet port connectible to the IT stage 63 feed water inlet, a permeate outlet port for filtered product water, and a concentrate/reject outlet port for brine. RO unit 73 of invention currently utilizes a single RO element but contemplates that invention may comprise multiple RO elements coupled in parallel for fluid communication or multiple RO elements coupled in series for fluid communication. The RO element of RO unit 73 is a thin film composite (TFC) semi-permeable membrane operative for removing dissolved ions, typically in the form of dissolved salts, from the filtrate stream received from the PT stage 63. The TFC membrane being utilized in embodiment is an ultra-low pressure, high production element that can maintain a high rejection rate. It is contemplated that the invention can be utilized with alternative RO membrane technology, such as nano or ultra filtration and the description of the invention is intended to cover all alternatives, modifications, and equivalent arrangements as may be included within the spirit and scope of the water appliance invention. A permeate stream is created from the portion of the filtrate stream that penetrates the membrane of RO element. Permeate stream then exits the RO unit 73 along the fluid stream 60 through check valve 54 utilized for prevention of reverse water flow then enters into the de-ionization unit 81. A concentrate stream, in which the concentrated dissolved ions rejected by the membrane of RO unit 73 are entrained, is formed by the remainder of the filtrate stream that exits the RO unit 73 passing through a flow control 59. The flow control 59 or restrictor on the reject water outlet drain line 74 is formed by utilizing a capillary tube assembly restricting the flow and providing the suitable back pressure for operation of the reverse osmosis membrane. The capillary tube, mounted inline with a normally closed solenoid valve 80 is opened or activated when product dispenser 62 is turned on allowing water to flow through a flow switch 79 completing electric circuit through relay switch 87 and allowing concentrate (reject water outlet drain line 74) to flow to grey water drain. The subject embodiment utilizes a product to reject water ratio of approximately 1 to 2, but it also contemplated by the inventor of possible incorporation of recirculation loop of concentrate to reduce volume of reject water to drain. Those skilled in the art will recognize that RO unit 73 components described herein of the invention could be arranged in somewhat different configurations.

Now moving to the control, monitor, and diagnostic unit 1, 72 for water purification RO unit 73 which includes first 75 and second 76 conductivity cells located in the input water path and the purified product water path of the RO unit 73, respectively. The conductivity cells produce output signals exhibiting amplitudes representative of the impurity concentrations in the respective water paths. The display on monitor unit 1, 72 provides an indication of the total dissolved salt concentrations of the input filtrate water from conductivity cell 75 and an indication of rejection or water purity from conductivity cell 76 in parts per million (PPM) and is an indication if RO unit 73 product water meets the desired parameter. The exceeding of limits of percent impurity rejection or impurity concentration can be detected in PPM directly from digital display on the control monitor 72 and indicates RO product quality, rejection ratio, and RO element failure. It is contemplated that alternatives, modifications, and equivalent arrangements of monitor and control system inclusive of alarm signals, remote bio-sensing, relays, circuit boards, or indicator lamps located on control panel 34 FIG. 2 may be included within the spirit and scope of the water appliance invention.

In the current embodiment the high purity water stream exiting RO unit 73 and conductivity cell 76, enters de-ionization (DI) unit 81, consisting of two parallel mixed bed polishing cartridges having synthetic resins which comprise 60% anion resins and 40% cation resins. The 60/40 mixture of resins provides a good overall approximation of the ratio of the cation to anion contaminants and removes dissolved, ionized materials such as salts, acids and bases. It is contemplated that the ratio of anion to cation resins may vary determinate of the application of water appliance 10 invention. It is also contemplated that a capacitive de-ionization (CDI) module may alternately be utilized and is inclusive of the description of the water purification components and is intended to cover all alternatives, modifications, and equivalent arrangements as may be included within the spirit and scope of the water appliance invention.

Now comes control, monitor, and diagnostic unit 2, 72, of water purification system 40 which includes third conductivity cell 77 located in the output water path of de-ionization unit 81 and fourth conductivity cell 78 located in the output water path of mineral injection unit 86, respectively. The conductivity cells produce output signals exhibiting amplitudes representative of the purity concentrations of DI unit 81 and dissolved mineral concentrations of mineral injection unit 86 in their respective water paths. These signals are detected and modified by circuitry which imposes logarithmic characteristics upon the signals. The signal from conductivity cell 77 to monitor unit 2, 72 provides an indication of the purity of DI 81 water path in parts per million (PPM) and is an indicator of exceeding the desired limits of impurity concentration which does not meet the desired criteria of water parameter. The signal from conductivity cell 78 to monitor unit 2, 72 provides measurement of mineral concentration in parts per million (PPM) and the subsequent loss of desired mineral concentration of product water indicating a need for mineral filter replacement. The percent of DI purity or mineral concentration can be detected in PPM directly from digital display on the control monitor 72. It is contemplated that alternatives, modifications, and equivalent arrangements of monitor and control system inclusive of alarm signals, remote bio-sensing, relays, circuit boards, or indicator lamps on control panel 34 with reference to FIG. 2 may also be included within the spirit and scope of the water appliance invention.

The ultra-pure water stream next enters and permeates the mineral injection cartridge 86 of the embodiment utilizing a single mineral element but inventor contemplates the invention may comprise multiple mineral matrix elements coupled in parallel or multiple mineral elements coupled in series. Mineral cartridge 86 presently embodies a magnesium/calcium mineral matrix but is contemplated that alternatives, modifications, and equivalent arrangements of mineral infusion or injection and specialized blends of macro/micro mineral matrixes may be inclusive within the spirit and scope of the water appliance invention. The ultra-pure water permeating the mineral complex cartridge 86 dissolves and infuses the mineral matrix with the high purity water improving quality, taste, and complexion of the water product. After the water exits the mineral cartridge 86, a check valve 55 and blending/shut-off valve 57 are installed on the downstream side of conductivity cell 78, safeguarding against any potential reverse flow of the fluid stream 60. Those skilled in the art will recognize that check valve 55 described herein of the invention could be positioned or located in the fluid line 60 in alternate placements.

The current embodiment of invention is inclusive of a purified water blending loop 85 coupled into high purity fluid line 60 after conductivity cell 77 and before mineral injection cartridge 86, then re-coupled back to high purity fluid line 60 after blending valve 57 and before conductivity cell 88. The high purity water blending loop 85 incorporates a check valve 56 for protection of reverse water flow and a blending valve 58 for adjustment of desired amount of high purity water to blend with mineral infused water. It is contemplated that blending loop may not be a fundamental component in final production design but is included in current embodiment of invention for testing, diagnostics, and obtainment of the desired amount of concentrated entrainment of minerals in the purified product water. It is also contemplated that alternatives, modifications, and equivalent arrangements of blending loop 85 inclusive of remote sensing, monitoring, relays, or blending valves may be included within the spirit and scope of the water appliance invention.

Next is control, monitor, and diagnostic unit 3, 72, of water purification system 40 which includes fifth conductivity cell 88 located in the output water path of mineral injection unit 86 and blending loop 85 and sixth conductivity cell 89 located in the output water path of water enhancer device 84. The conductivity cells 88 and 89 produce output signals exhibiting amplitudes representative of the concentrations of dissolved mineral concentrations of mineral injection unit 86. The signal from conductivity cell 88 to monitor unit 3, 72 provides an indication of mineral concentration in parts per million (PPM) after blending minerals with high purity water to obtain the desired mineral concentration. The percent of blended high purity water and mineral concentration can be detected in PPM directly from digital display on the control monitor unit 3, 72. The signal from conductivity cell 89 to monitor unit 3, 72 provides an additional indication of mineral concentration in parts per million (PPM) after mineral enhanced high purity product water has passed through water enhancement device 84. It is the intention of the inventor that alternatives, modifications, and equivalent arrangements of the monitor and control system unit 3, 72, may be included within the spirit and scope of the water appliance invention such as pH and/or ORP diagnostic capabilities and additional alarm and/or indicator lamp signals. It is also contemplated that monitor unit 3, 72 may not be a fundamental component in final production design but is included in current embodiment of invention for testing, diagnostics, and obtainment of the desired amount of concentrated entrainment of minerals in the purified product water.

The water stream now enters final filtration or polishing carbon filter 83 consisting of fine mesh activated carbon. This filter is designated as a polishing filter for any residual organics and improvement of piquancy of the purified mineralized water product. Again it is contemplated that the description of the polishing carbon filter 83 is intended to cover all alternatives, modifications, and equivalent arrangements as may be included within the spirit and scope of the water appliance invention.

As the product water stream exits the polishing carbon filter it now enters the water enhancer 84, the last and final stage of purification system 40, a proprietary process and device manufactured by PursaNova Limited, 1483 Rollins Road, Burlingame, Calif. 94010. This proprietary process and enhancement device emanating through the combined fields of biochemistry and quantum physics, consisting of specially engineered and blended proprietary ores of ceramic components of which are contained or enclosed in a stainless steel chamber. These specially blended ceramic ores, function through resonate frequencies broadcast to the water molecules, similar to what transpires in nature, creating an effect by activating the electrical charges of the hydrogen atom. These resonating frequencies transmit at a particular wavelength and cause changes to occur to the chemical structure or bonds of the water molecules. The ores continuously resonate these frequencies or wavelengths producing a buffering or balancing reaction to the water. This activation of the water molecules produces a water more harmonically compatible for biological organisms thus improving salubrity of the final purified and enhanced water product. It is the inventors intention and it is contemplated that the description of water enhancer 84 is intended to cover all alternatives, modifications, and equivalent arrangements of water enhancement technology such as ionization technology or magnetic technology as may be included within the spirit and scope of the water appliance invention.

Turning back to FIG. 5 the purified and enhanced water stream now exits the water enhancer 84 passing through the flow switch assembly 79 which is activated by water flowing out of water appliance 10 to water dispenser 62. The flow switch 79 activates the booster pump 70, opens the normally closed solenoid valve 80 by way of relay switch 87 allowing concentrate to flow to grey water drain line 74 and booster pump 70 to increase flow pressure to R.O. unit 73. When product dispenser 62 is closed, flow switch 79 is de-activated, closing solenoid valve 80, ceasing the reject water flow to the grey water drain 74, and shutting booster pump 70 off. The incorporation of relay switch 87 is designed to protect and extend life of flow switch 79, solenoid 80, and motor on booster pump 70 due to possible electrical spikes and continual on and off cycling of the water appliance 10. The flow switch 79 can be located at a number of other places on fluid line 60 but was inventors intention to locate at present location due to cleanliness of product water and improved performance of flow switch 79.

As shown in FIG. 2, 38 and FIG. 3, 38 power chord extending from water appliance 10 from surge protected power strip 42 or similar multiple power outlet for activation or energizing of electrical water purification components. Electrical components receptacles 65 are plugged into a multiple power outlet 42 inclusive of surge protection. Power switch FIG. 1, 35 is wired to power strip 42, for emergency shut-off of electrical power or for servicing of appliance, currently located and positioned on control panel 34 for ease of access and utilization. It is contemplated that the invention can be used with a variety of voltage including DC or AC arrangements and the description of the invention is intended to cover all alternatives, modifications, and equivalent arrangements as may be included within the spirit and scope.

The final component of water purification system 40 is the product dispenser 62 comprising a faucet assembly and or additional product dispensing lines to refrigerator or other such outlets. Although product dispenser as described is component of water appliance invention it is not physically located on actual appliance but rather located at sink or other designated location for dispersion. Product dispenser 62 can be aesthetically integrated by the appropriate matching selection of finishes and styles of faucets or dispensers and is contemplated by inventor that some variations may be utilized on different models of invention, including location of product dispenser 60 and is intended but not limited to cover all alternatives, modifications, and equivalent arrangements as may be included within the spirit and scope of the water appliance invention.

Figure 6:
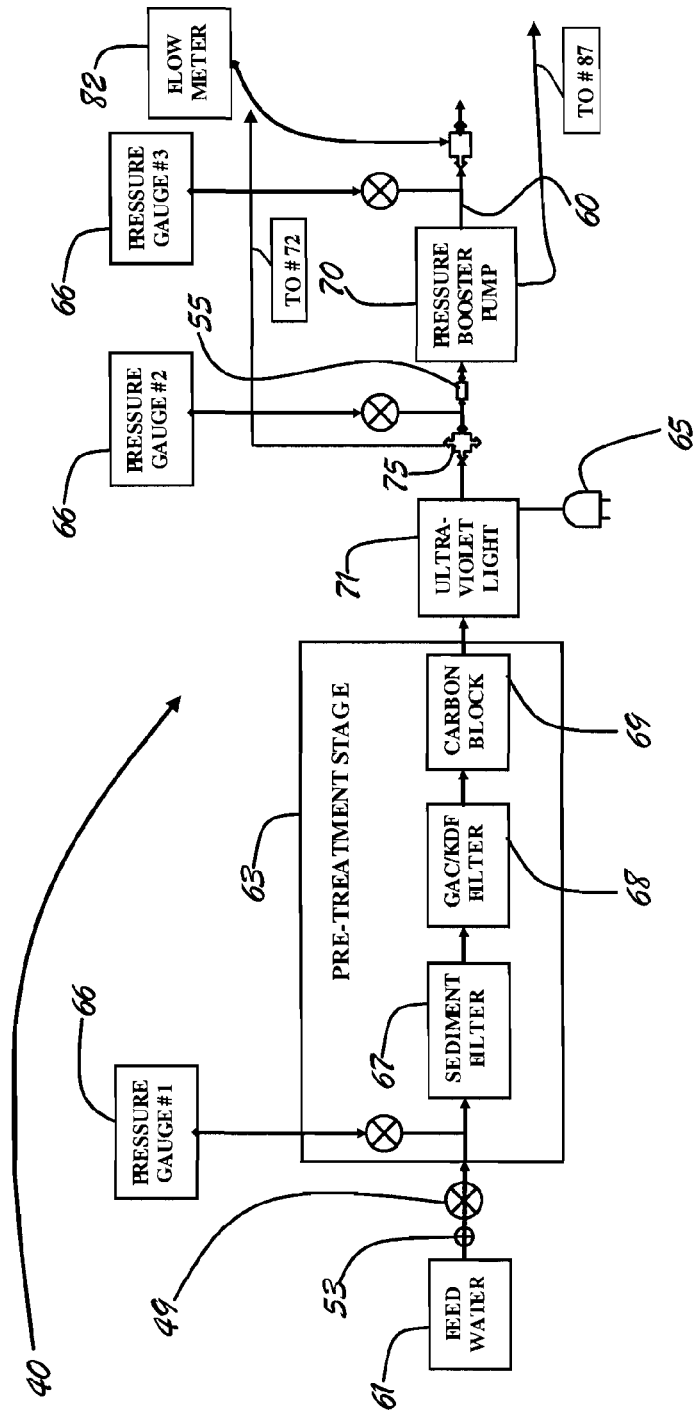
FIG. 6 is a schematic view of an alternative embodiment of a water purification system in accordance with the principles of the invention.

With reference to FIG. 6 in which like reference numerals refer to like features in FIG. 5 and in an alternative embodiment, water purification system 40 all components are the same as FIG. 5 with the exception of removal of scale neutralizer 64. Scale neutralizer 64 is designed for reduction of scaling of high mineral content in feed water or in the absence of soft water at point of entry.

With reference to FIG. 7 in which like reference numerals refer to like features in FIG. 5 and in an alternative embodiment, water purification system 40 all components are the same as FIG. 5 with the exception of removal of booster pump 70. Not all applications of water appliance invention will require booster pump if sufficient pressure and flow rates are available. It is contemplated by inventor that some variations may be utilized on different models of invention and is intended but not limited to cover all alternatives, modifications, and equivalent arrangements as may be included within the spirit and scope of the water appliance invention.

With reference to FIG. 8 in which like reference numerals refer to like features in FIG. 5 and in an alternative embodiment, water purification system 40 all components and description are the same as FIG. 7 with the exception of removal of scale neutralizer 64.

With reference to FIG. 9 in which like reference numerals refer to like features in FIG. 5 and in an alternative embodiment, water purification system 40 all components are the same as FIG. 5 with the exception of removal of blending loop 85, check valve 56, and blending valve 58. It is contemplated by inventor that blending loop may not be inclusive or a fundamental component in final production of water appliance invention. Alternate embodiment FIG. 9, control, monitor, and diagnostic unit 3, 72, of water purification system 40 includes fifth conductivity cell 88 located in the output water path of mineral cartridge 86 and sixth conductivity cell 89 located in the output water path of water enhancer device 84.

The signals from conductivity cells 88 and 89 to monitor unit 3, 72 currently designated in preferred embodiment FIG. 5 to provide indication of mineral concentration in parts per million (PPM) after entrainment of minerals from mineral cartridge 86 and enhancement from water enhancer 84 respectively with the purified water product, may be alternately utilized in embodiment for pH and ORP diagnostics and monitoring capabilities. It is the intention of the inventor that alternatives, modifications, and equivalent arrangements of the monitor and control system unit 3, 72, may be included within the spirit and scope of the water appliance invention. Booster pump 70 is shown as component in alternate embodiment FIG. 9, but is also contemplated by inventor that this alternate embodiment may or may not be inclusive of booster pump 70.

With reference to FIG. 10 in which like reference numerals refer to like features in FIG. 5 and in an alternative embodiment, water purification system 40 all components and description are the same as FIG. 9 with the exception of removal of scale neutralizer 64. Booster pump 70 is shown as component in alternate embodiment FIG. 10, but is contemplated by inventor that this alternate embodiment may or may not be inclusive of booster pump 70.

Figure 11:
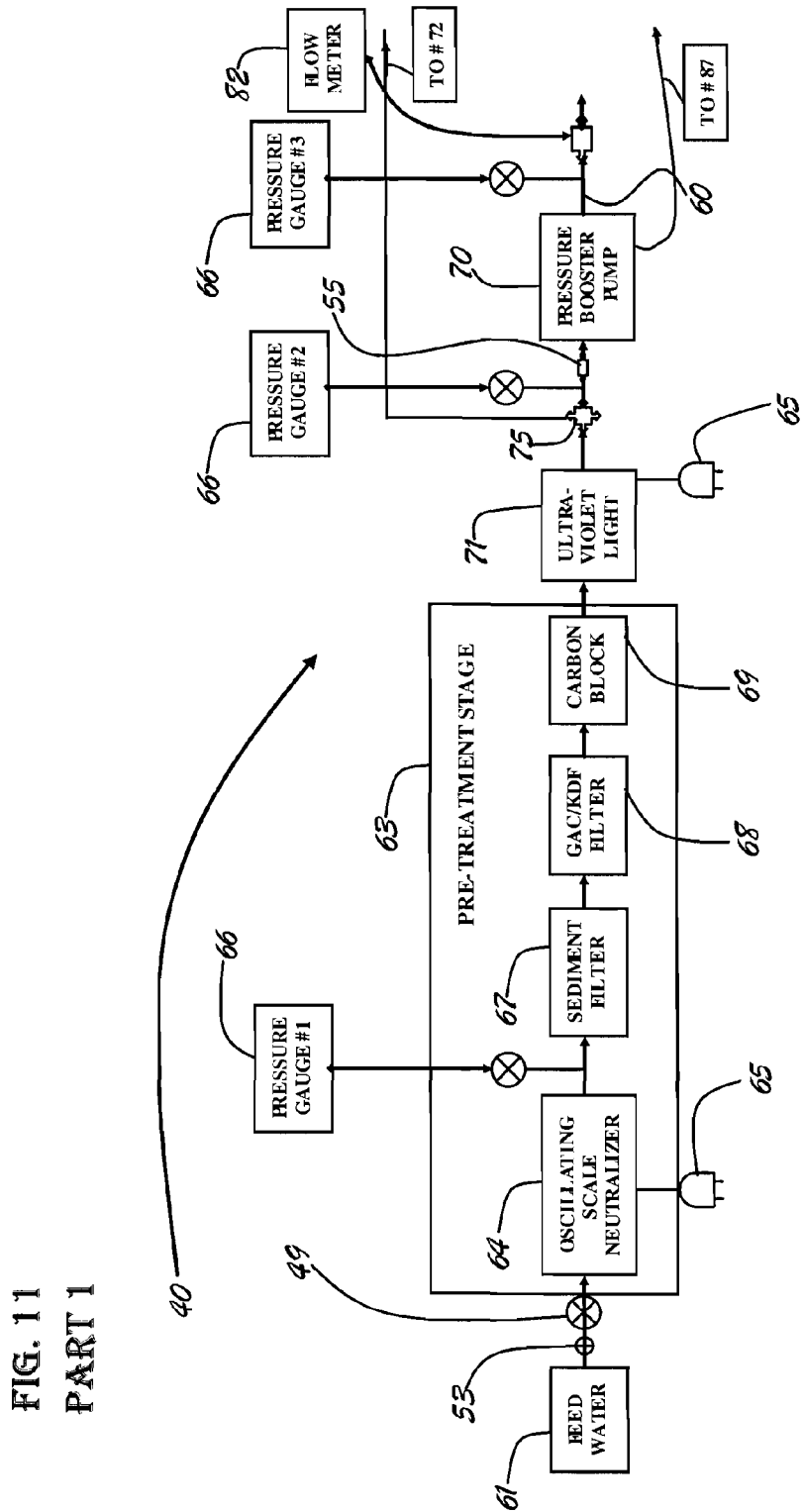
FIG. 11 is a schematic view of an alternative embodiment of a water purification system in accordance with the principles of the invention.

With reference to FIG. 11 in which like reference numerals refer to like features in FIG. 5 and in an alternative embodiment, water purification system 40 all components are the same as FIG. 9 with the exception of removal of control monitor unit 3, 72 and diagnostic monitor cells 88 and 89. Booster pump 70 is shown as component in alternate embodiment FIG. 11, but is contemplated by inventor that this alternate embodiment may or may not be inclusive of booster pump 70.

Figure 12:
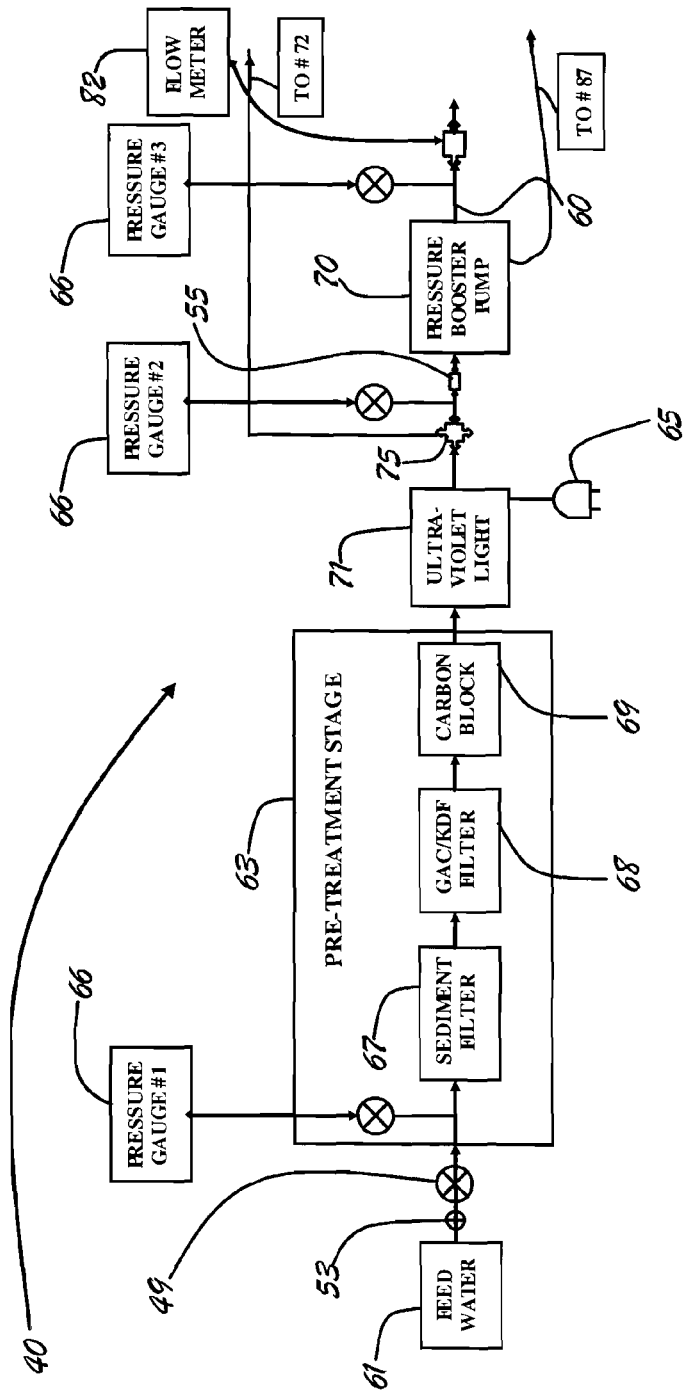
FIG. 12 is a schematic view of an alternative embodiment of a water purification system in accordance with the principles of the invention.

With reference to FIG. 12 in which like reference numerals refer to like features in FIG. 5 and in an alternative embodiment, water purification system 40 all components and description are the same as FIG. 11 with the exception of removal of scale neutralizer 64. Booster pump 70 is shown as component in alternate embodiment FIG. 12, but is contemplated by inventor that this alternate embodiment may or may not be inclusive of booster pump 70.

With reference to FIG. 13 in which like reference numerals refer to like features in FIG. 5 and in an alternative embodiment, water purification system 40 all components are the same as FIG. 11, with the exception of removal of de-ionization filters 81 and change of order and placement of conductivity cells 77 and 78 of control monitor unit 2, 72 in fluid line 60. Conductivity cell 77 is positioned in the output water path of mineral cartridge 86 and fourth conductivity cell 78 is positioned in the output water path of water enhancer device 84, respectively. The conductivity cells 77 and 78 produce output signals exhibiting amplitudes representative of the concentrations of dissolved mineral concentrations of mineral cartridge 86. The signal from conductivity cell 77 to monitor unit 2, 72 provides measurement of mineral concentration in parts per million (PPM) and the subsequent loss of desired mineral concentration of product water indicating a need for mineral cartridge replacement. The signal from conductivity cell 78 to monitor unit 2, 72 provides an additional indication of mineral concentration in parts per million (PPM) after mineral enhanced high purity product water has passed through water enhancement device 84. It is the intention of the inventor that alternatives, modifications, and equivalent arrangements of the monitor and control system unit 2, 72, that may be included within the spirit and scope of the water appliance invention be inclusive of pH and/or ORP diagnostic capabilities and additional alarm and/or indicator lamp signals. Booster pump 70 is shown as component in alternate embodiment FIG. 13, but is contemplated by inventor that this alternate embodiment may or may not be inclusive of booster pump 70.

With reference to FIG. 14 in which like reference numerals refer to like features in FIG. 5 and in an alternative embodiment, water purification system 40 all components and description are the same as FIG. 13, with the exception of removal of scale neutralizer 64. Booster pump 70 is shown as component in alternate embodiment FIG. 14, but is contemplated by inventor that this alternate embodiment may or may not be inclusive of booster pump 70.

With reference to FIG. 15 in which like reference numerals refer to like features in FIG. 5 and in an alternative embodiment, water purification system 40 all components are the same as FIG. 13, with the exception of removal of water enhancer 84 and conductivity cell 78 of control monitor unit 2, 72. Conductivity cell 77 is positioned in the output water path of mineral cartridge 86 and the signal from conductivity cell 77 to monitor unit 2, 72 provides measurement of mineral concentration in parts per million (PPM) and the subsequent loss of desired mineral concentration of product water indicating a need for mineral cartridge replacement. It is the intention of the inventor that alternatives, modifications, and equivalent arrangements of the monitor and control system unit 2, 72, may be included within the spirit and scope of the water appliance invention. Booster pump 70 is shown as component in alternate embodiment FIG. 15, but is also contemplated by inventor that this alternate embodiment may or may not be inclusive of booster pump 70.

Figure 16:
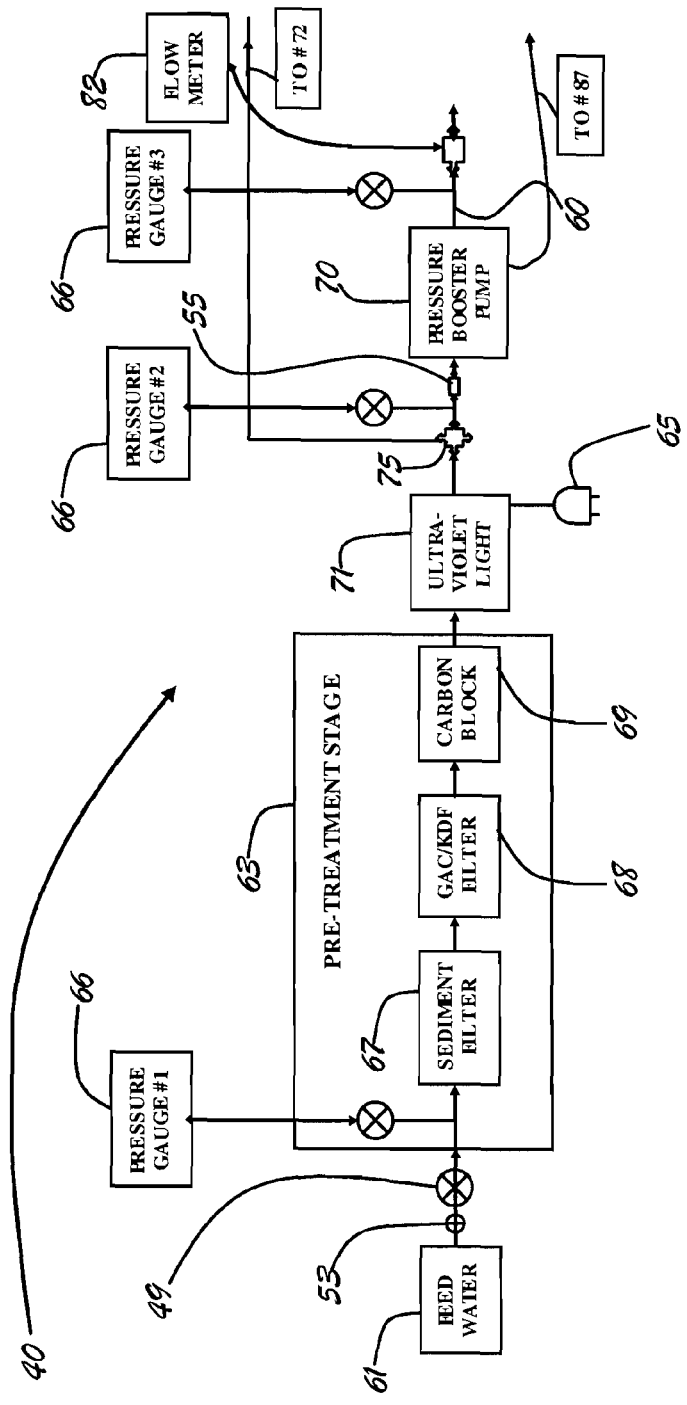
FIG. 16 is a schematic view of an alternative embodiment of a water purification system in accordance with the principles of the invention.

With reference to FIG. 16 in which like reference numerals refer to like features in FIG. 5 and in an alternative embodiment, water purification system 40 all components and description are the same as FIG. 15, with the exception of removal of scale neutralizer 64. Booster pump 70 is shown as component in alternate embodiment FIG. 16, but is contemplated by inventor that this alternate embodiment may or may not be inclusive of booster pump 70.

With reference to FIG. 17 in which like reference numerals refer to like features in FIG. 5 and in an alternative embodiment, water purification system 40 all components are the same as FIG. 13, with the exception of removal of mineral injection cartridge 86 and control monitor unit 2, 72 and diagnostic monitor cells 77 and 78. Booster pump 70 is shown as component in alternate embodiment FIG. 17, but is contemplated by inventor that this alternate embodiment may or may not be inclusive of booster pump 70.

With reference to FIG. 18 in which like reference numerals refer to like features in FIG. 5 and in an alternative embodiment, water purification system 40 all components and description are the same as FIG. 17, with the exception of removal of scale neutralizer 64. Booster pump 70 is shown as component in alternate embodiment FIG. 18, but is contemplated by inventor that this alternate embodiment may or may not be inclusive of booster pump 70.

With reference to FIG. 19 in which like reference numerals refer to like features in FIG. 5 and in an alternative embodiment, water purification system 40 all components are the same as FIG. 17, with the exception of removal of water enhancer 84. Booster pump 70 is shown as component in alternate embodiment FIG. 18, but is contemplated by inventor that this alternate embodiment may or may not be inclusive of booster pump 70.

With reference to FIG. 20 in which like reference numerals refer to like features in FIG. 5 and in an alternative embodiment, water purification system 40 all components and description are the same as FIG. 19, with the exception of removal of scale neutralizer 64. Booster pump 70 is shown as component in alternate embodiment FIG. 20, but is contemplated by inventor that this alternate embodiment may or may not be inclusive of booster pump 70.

With reference to FIG. 21 in which like reference numerals refer to like features in FIG. 5 and in an alternative embodiment, water purification system 40 all components are the same as FIG. 19, with the exception of removal of ultra-violet light 71. Booster pump 70 is shown as component in alternate embodiment FIG. 21, but is contemplated by inventor that this alternate embodiment may or may not be inclusive of booster pump 70.

Figure 22:
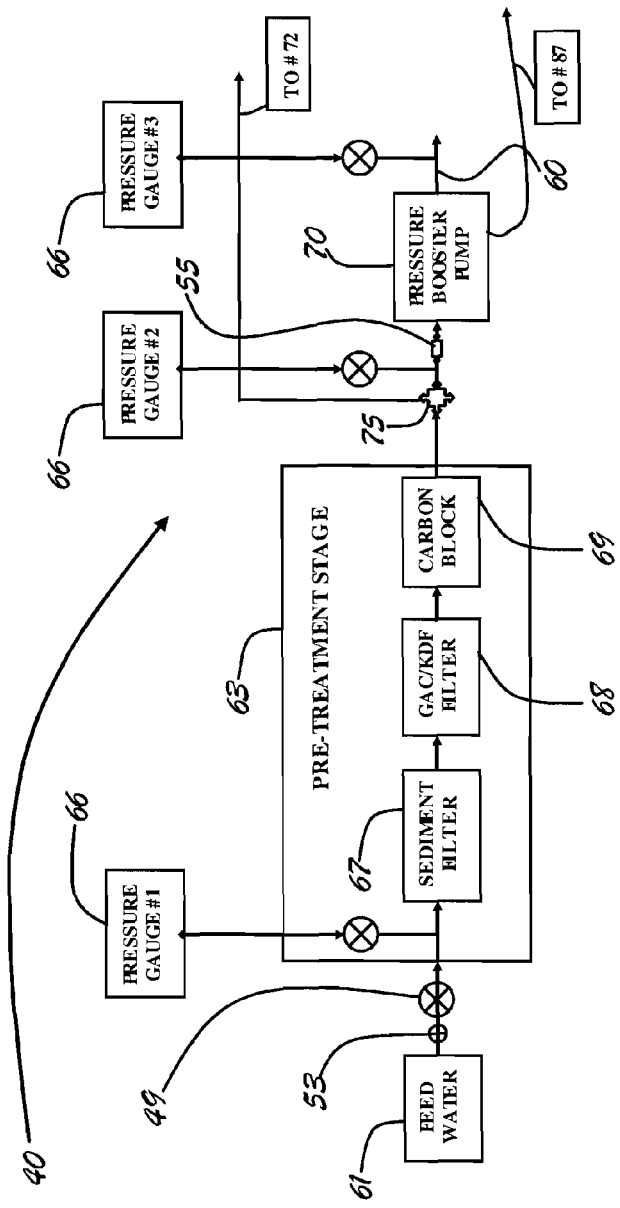
FIG. 22 is a schematic view of an alternative embodiment of a water purification system in accordance with the principles of the invention.

With reference to FIG. 22 in which like reference numerals refer to like features in FIG. 5 and in an alternative embodiment, water purification system 40 all components and description are the same as FIG. 21, with the exception of removal of scale neutralizer 64. Booster pump 70 is shown as component in alternate embodiment FIG. 22, but is contemplated by inventor that this alternate embodiment may or may not be inclusive of booster pump 70.

It is understood that the foregoing examples are merely illustrative of the present invention. Certain modifications of the articles and/or methods employed may be made and still achieve the objectives of the invention. Such modifications are contemplated as within the scope of the claimed invention.

The invention claimed is:

1. A water purification and conditioning apparatus through which water to be treated flows comprising, in succession:
   a water inlet;
   a pretreatment filter unit, the pretreatment unit comprising a scale neutralizer;
   an ultraviolet light source;
   a first conductivity cell;
   a booster pump;
   a flow meter;
   a reverse osmosis unit comprising a grey water outlet;
   a second conductivity cell, wherein the first conductivity cell and the second conductivity cell produce output signals sent to an at least one control unit to indicate the purity of water leaving the reverse osmosis unit through a purified water outlet;
   a deionization unit;
   a third conductivity cell;
   a mineral injection unit comprising an inlet and an outlet;
   a fourth conductivity cell proximate the outlet of the mineral injection unit;
   a blending loop by-passing the mineral injection unit connected before the mineral injection unit inlet and before the fourth conductivity cell, the blending loop comprising a blending valve, and wherein the third conductivity cell produces an output signal sent to the at least one control unit to indicate purity of water leaving the deionization unit, and the fourth conductivity cell produces an output signal sent to the at least one control unit to indicate dissolved mineral concentration, the output signals of the third and fourth conductivity cells capable of being compared by the at least one control unit and dissolved mineral concentration adjusted by the at least one control unit through the blending valve;
   a fifth conductivity cell;
   a water enhancing unit;
   a sixth conductivity cell, wherein the fifth conductivity cell produces an output signal sent to the at least one control unit and the sixth conductivity cell produces a signal sent to the at least one control unit to indicate purity of the water leaving the apparatus; and
   a water outlet;

wherein the apparatus is configured for integration into kitchen cabinetry and under kitchen countertops.

2. The apparatus of claim 1, wherein said sixth conductivity cell produces an output signal to indicate a condition selected from the group consisting of dissolved mineral concentration, pH, and ORP.

3. The apparatus of claim 1, wherein at least one of said conductivity cells relay an output signal to said at least one control unit wirelessly.

4. The apparatus of claim 1, wherein said scale neutralizer comprises a microprocessor control unit to create a square-wave electric current that sweeps a broad range of frequencies, and at least one solenoid induction coil to induce a modulating electric field through which said water to be treated flows.

5. The apparatus of claim 1, further comprising at least one pressure gauge.

6. The apparatus of claim 5, wherein the at least one pressure gauge produces an output signal sent to the at least one control unit.

* * * * *